(12) United States Patent
Teegarden et al.

(10) Patent No.: US 12,175,509 B2
(45) Date of Patent: *Dec. 24, 2024

(54) MOBILE TOBACCO RECEIVING STATION

(71) Applicant: Altria Client Services LLC, Richmond, VA (US)

(72) Inventors: Hal L. Teegarden, Chesterfield, VA (US); David Scott Ray, Chesterfield, VA (US); John Stewart Livesay, Chesterfield, VA (US); Isidro Gomez, Midlothian, VA (US)

(73) Assignee: Altria Client Services LLC, Richmond, VA (US)

( * ) Notice: Subject to any disclaimer, the term of this patent is extended or adjusted under 35 U.S.C. 154(b) by 1355 days.

This patent is subject to a terminal disclaimer.

(21) Appl. No.: 16/785,749

(22) Filed: Feb. 10, 2020

(65) Prior Publication Data
US 2020/0175560 A1 Jun. 4, 2020

Related U.S. Application Data

(63) Continuation of application No. 14/575,749, filed on Dec. 18, 2014, now Pat. No. 10,572,920, which is a
(Continued)

(51) Int. Cl.
*A24B 1/00* (2006.01)
*B60P 1/00* (2006.01)
(Continued)

(52) U.S. Cl.
CPC .......... *G06Q 30/0607* (2013.01); *A24B 1/00* (2013.01); *B60P 1/00* (2013.01); *G01G 17/00* (2013.01);
(Continued)

(58) Field of Classification Search
CPC .......... G01G 17/00; G01G 19/40; A24B 1/00; B60P 1/00
See application file for complete search history.

(56) References Cited

U.S. PATENT DOCUMENTS 2,568,330 A    9/1951  Flippin
3,590,731 A *  7/1971  Nichols ................. B30B 9/3003
                                                   100/269.06
(Continued)

OTHER PUBLICATIONS

"HEC Standard Bale Elevator Owner's and Operator's Manual." Tractor Supply, Apr. 15, 2005. www.tractorsupply.com/static/sites/TSC/downloads/ProdContentPDFs/1215381_Man1.pdf (Year: 2005).

(Continued)

*Primary Examiner* — Natalie Huls
(74) *Attorney, Agent, or Firm* — Harness, Dickey & Pierce, P.L.C.

(57) ABSTRACT

A system, method, computer program product, and mobile receiving station for receiving and processing leaf tobacco at a location of a tobacco farmer, including processing the tobacco leaf at the location, including means for weighing and grading of the received tobacco leaf and, optionally, determining moisture content and transmitting information relating to the optionally determined moisture content, the weight, and the grade of the received tobacco leaf to a tobacco product manufacturing facility over a communications link.

20 Claims, 24 Drawing Sheets

Related U.S. Application Data continuation of application No. 12/274,644, filed on Nov. 20, 2008, now abandoned.

(60) Provisional application No. 60/989,365, filed on Nov. 20, 2007.

(51) Int. Cl.
*G01G 17/00* (2006.01)
*G01G 19/40* (2006.01)
*G06Q 30/0601* (2023.01)
*G06Q 40/04* (2012.01)

(52) U.S. Cl.
CPC ......... *G01G 19/40* (2013.01); *G06Q 30/0603* (2013.01); *G06Q 40/04* (2013.01)

(56) References Cited

U.S. PATENT DOCUMENTS

| | | | |
|---|---|---|---|
| 3,910,757 A | 10/1975 | Taylor et al. | |
| 4,005,784 A * | 2/1977 | Wilson | B60P 1/36 414/532 |
| 4,280,575 A * | 7/1981 | di Rosa | B29B 15/023 177/DIG. 11 |
| 4,592,698 A * | 6/1986 | Semp | A24B 3/00 414/412 |
| 5,088,271 A * | 2/1992 | Westaway | A01F 25/14 53/529 |
| 5,251,422 A * | 10/1993 | Goodman | B65B 5/061 53/251 |
| 5,950,178 A | 9/1999 | Borgato | |
| 6,328,520 B1 * | 12/2001 | Maclay | A01D 90/08 414/491 |
| 6,714,170 B2 | 3/2004 | Kleinschmidt | |
| 6,748,296 B2 | 6/2004 | Banerjee et al. | |
| 7,004,525 B1 | 2/2006 | Turnbow | |
| 7,004,706 B1 | 2/2006 | Wilson | |
| 7,387,480 B1 | 6/2008 | Bean | |
| 2002/0125177 A1 | 9/2002 | Burns et al. | |
| 2003/0009389 A1 | 1/2003 | Purvis | |
| 2003/0075416 A1 * | 4/2003 | Prutu | B07C 5/34 198/370.1 |
| 2006/0064458 A1 | 3/2006 | Gehrmann | |
| 2007/0170201 A1 | 7/2007 | Steffens | |

OTHER PUBLICATIONS

Rick Barrett, "Farming on the cutting edge: World Dairy Expo showcases technology aimed at small, midsize operations", Knight Ridder Tribune Business News, Washington: Oct. 6, 2006, p. 1 (Year: 2006).

United States Department of Agriculture Official Standard Grades, Burley Tobacco U.S. Type 31 and Foreign Type 93, Effective date (Nov. 5, 1990) (Year: 1990).

"Attention Burley Tabacco Growers", Feb. 22, 2007; The Mt. Vernon Signal; p. B8.

Custom-Fab Trailers online at http://customfabtrailers.com/horse.php Archived by Archive.org on or before Oct. 13, 2007; pp. 1-5.

Deon Hampton: "Auto glass service finding niche: Business"; McClatchy—Tribune Business News, Washington; Apr. 25, 2007; p. 1.

Carla Wilson; "Slaughtering goes mobile; Abattoir on wheels show cases its services to Metchosin farmers; [Final Edition]"; Times—Colonist; Victoria, B.C.; Apr. 19, 2007; p. C.1.FRO.

"Drivers-license units on the way; [Final Edition]" Orlando Sentinel; Aug. 11, 2007; p. B.3.; Orland Fla.

* cited by examiner

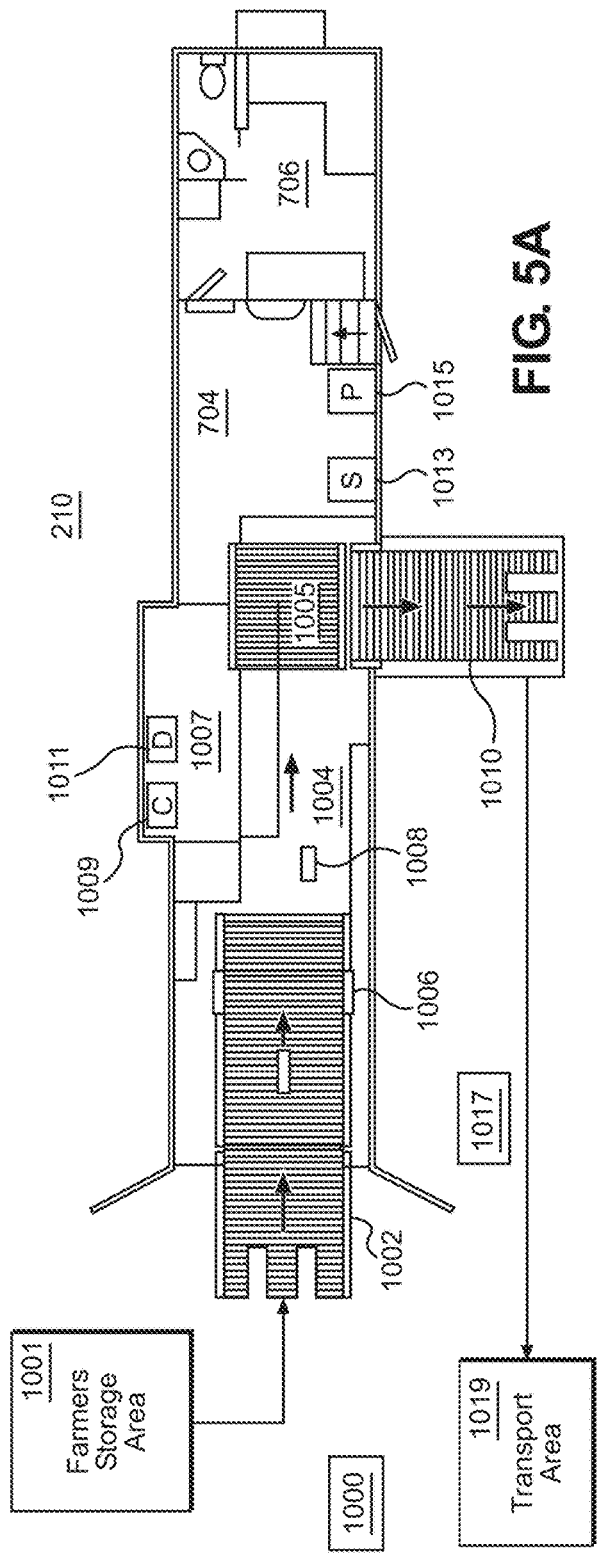
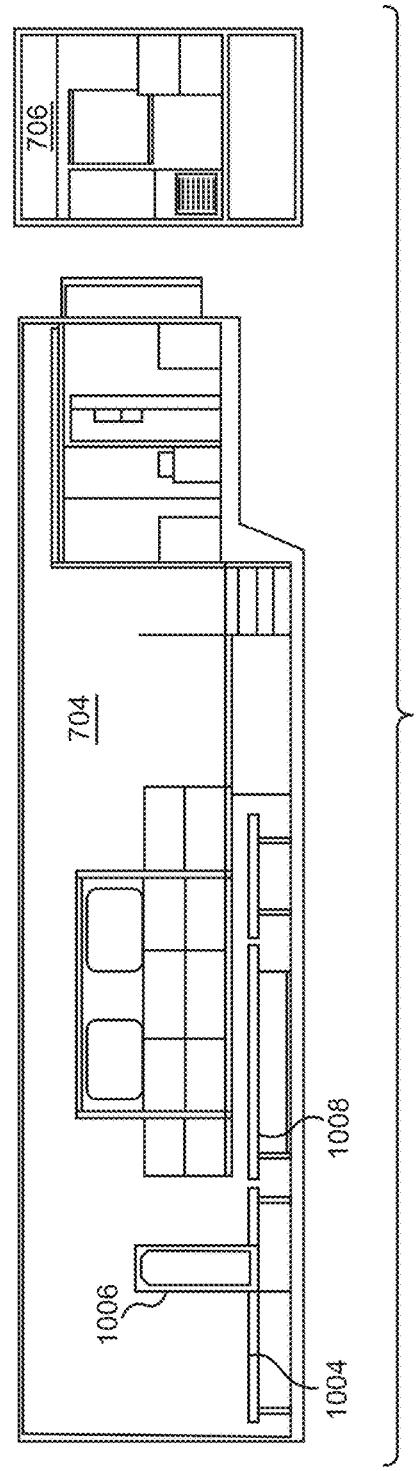
FIG. 5A
FIG. 5B

MOBILE TOBACCO RECEIVING STATION

RELATED APPLICATIONS

This patent application is a continuation of U.S. application Ser. No. 14/575,749, entitled "Mobile Tobacco Receiving Station", filed on Dec. 18, 2014, which is a continuation of U.S. application Ser. No. 12/274,644, entitled "Mobile Tobacco Receiving Station", filed on Nov. 20, 2008, and claims priority to the following provisional patent application: Provisional Application Ser. No. 60/989,365, entitled "Mobile Receiving Tobacco Station System and Method," filed on Nov. 20, 2007, the contents of each of which is hereby incorporated by reference herein in its entirety.

FIELD

The present invention generally relates to selling and purchasing of tobacco leaf, and more particularly to a method and system for tobacco leaf selling and purchasing using a mobile receiving station.

As shown in FIG. 1, leaf tobacco is sold by farmers at fixed brick-and-mortar receiving stations and auction houses. However, such systems lack flexibility and do not provide sufficient convenience, for example, for tobacco farmers located in dispersed geographical regions.

SUMMARY

Therefore, there is a need for a method and system that addresses the above and other problems. The above and other problems are addressed by the exemplary embodiments of the present invention, which provide a standalone mobile platform and business model that provides flexibility in tobacco buying and receiving services to tobacco growers in traditional and new and expanding areas. In an exemplary embodiment, a mobile receiving station (MRS) is provided, which can condense a conventional receiving line to about 25 feet and provide the associated finance and information services for creating a fully mobile operation. Advantageously, the mobile receiving station and associated business model allows tobacco product manufacturers (e.g., such as cigarette manufacturers) the flexibility and efficiency to support tobacco farming in both traditional and new and expanding areas by eliminating the transport and consignment costs and by providing a secure market and delivery location for the tobacco farmer. The overall design of the mobile receiving station greatly reduces receiving line operations from about a 70 foot line to about a 25 foot line, thus requiring a reduced number of personnel for its operation. All the necessary tobacco services, for example, including receiving, grading, staging for shipping, issuance of checks, accounting, inventory update, and the like, can all take place at the mobile receiving station. In addition, the mobile receiving station has demonstrated significant increases in efficiency of tobacco purchasing, often outperforming traditional receiving stations, and thus providing a key advantage to future business.

Accordingly, in exemplary aspects of the present invention there is provided a system, method, computer program product, and mobile receiving station for receiving and processing leaf tobacco at a location of a tobacco farmer, including processing the tobacco leaf at the location, including means for weighing and grading of the received tobacco leaf and optionally determining moisture content; and transmitting information relating to the optionally determined moisture content, the weight, and the grade of the received tobacco leaf to a tobacco product manufacturing facility over a communications link.

Still other aspects, features, and advantages of the present invention are readily apparent from the following detailed description, by illustrating a number of exemplary embodiments and implementations, including the best mode contemplated for carrying out the present invention. The present invention is also capable of other and different embodiments, and its several details can be modified in various respects, all without departing from the spirit and scope of the present invention. Accordingly, the drawings and descriptions are to be regarded as illustrative in nature, and not as restrictive.

BRIEF DESCRIPTION OF THE DRAWINGS

The embodiments of the present invention are illustrated by way of example, and not by way of limitation, in the figures of the accompanying drawings and in which like reference numerals refer to similar elements and in which:

FIGS. 3-5B illustrate an exemplary mobile tobacco leaf receiving station, according to exemplary embodiments of the present invention;

DETAILED DESCRIPTION

Figure 1:
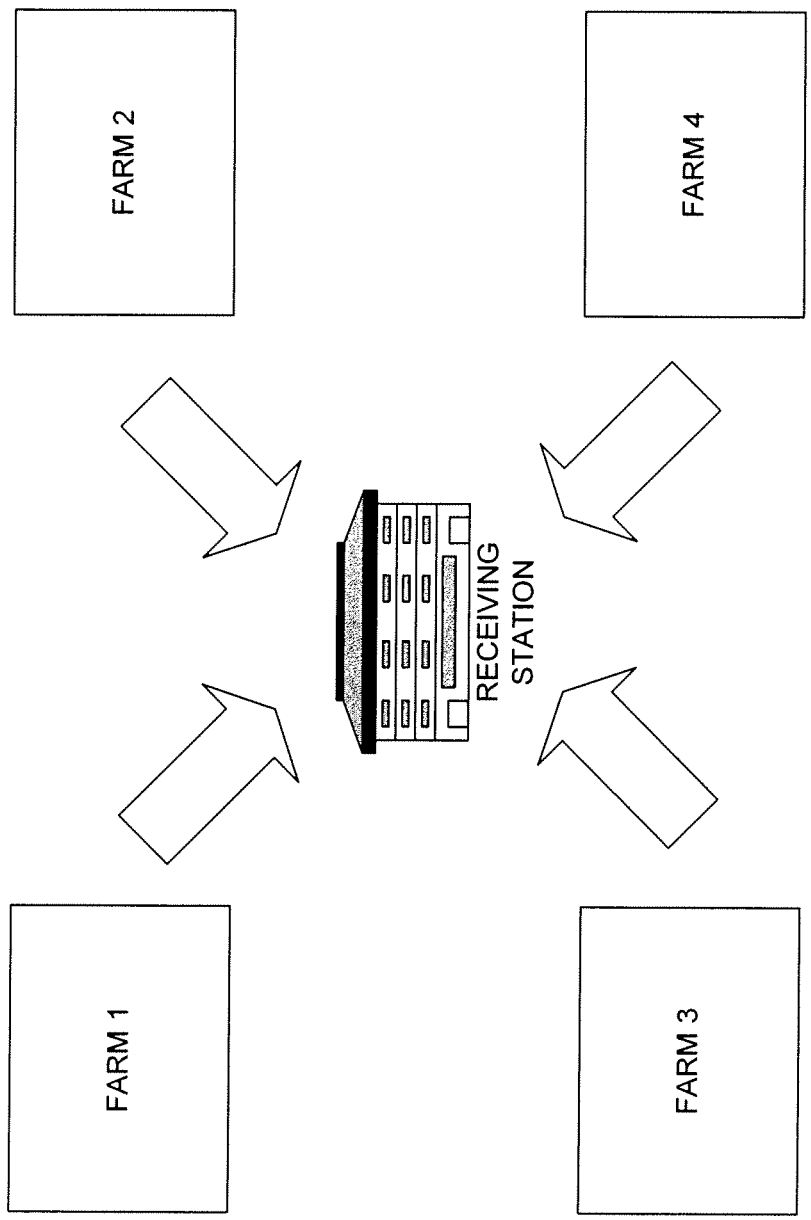
FIG. 1 illustrates a background art brick-and-mortar tobacco leaf receiving station.
Figure 2:
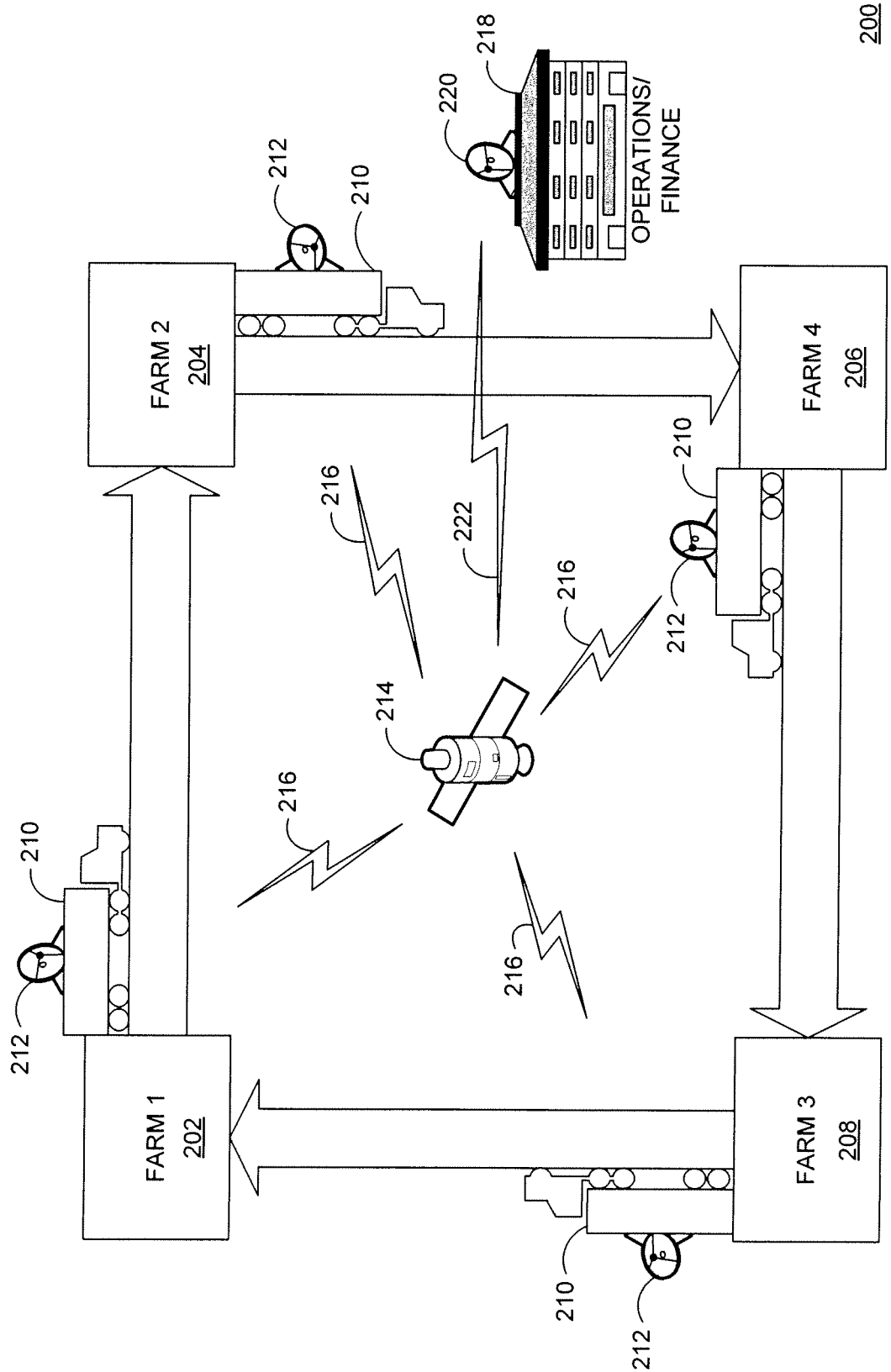
FIG. 2 illustrates an exemplary system employing mobile tobacco leaf receiving stations, according to an exemplary embodiment of the present invention.
Figure 3:
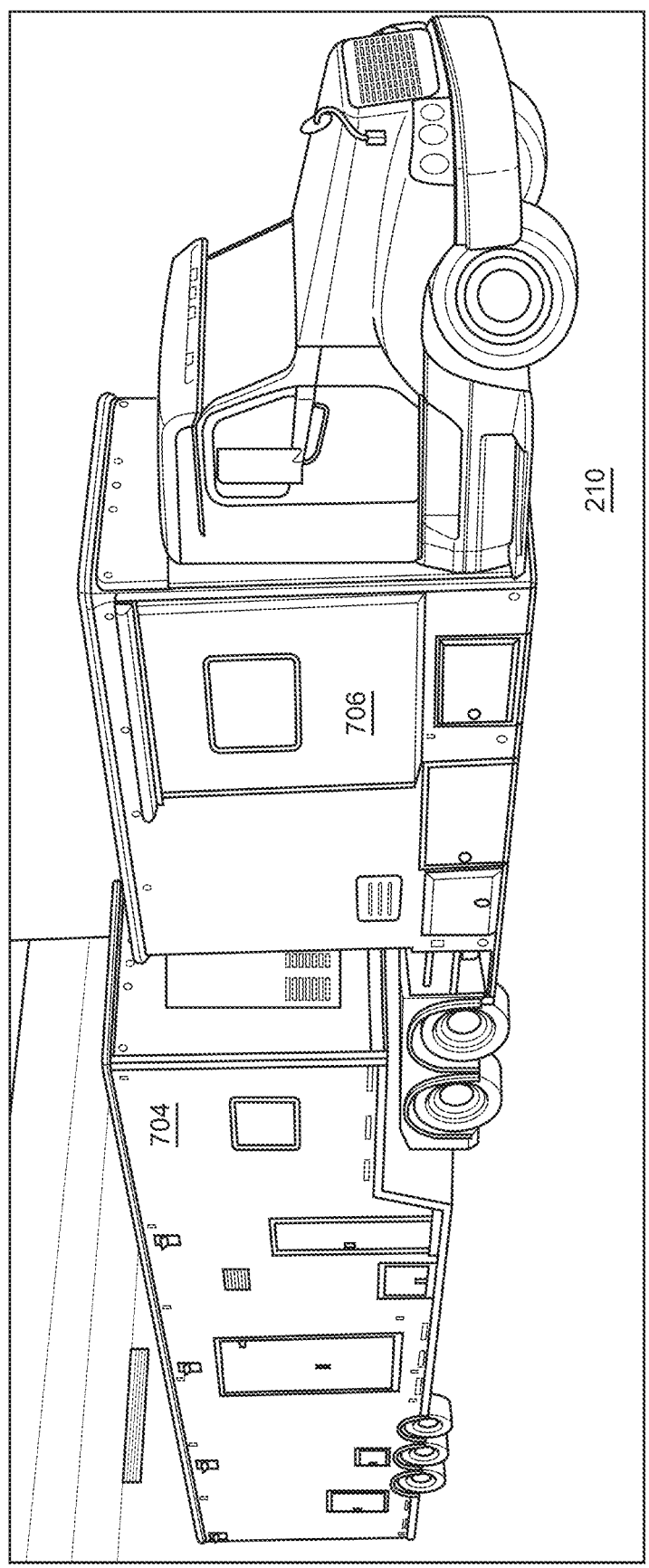
Figure 4:
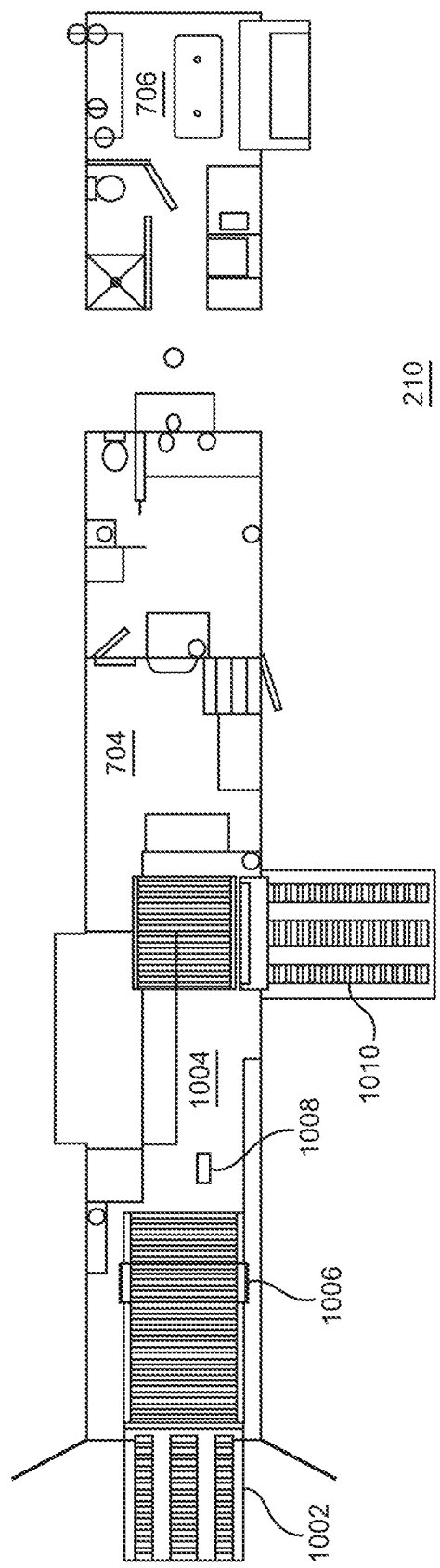

Referring now to the drawings, wherein like reference numerals designate identical or corresponding parts throughout the several views, and more particularly to FIG. 2 thereof, there is illustrated an exemplary system 200 employing one or more mobile tobacco leaf receiving stations, according to an exemplary embodiment of the present invention.

In FIG. 2, the exemplary system 200 can be employed to provide mobile tobacco leaf receiving services, including receiving, grading, staging for shipping, issuance of checks, and the like, with respect to geographically dispersed farms 202, 204, 206 and 208, via one or more mobile receiving stations 210. The mobile receiving stations 210 can include a satellite dish 212 for communicating with satellite 214, via satellite communications link 216. The satellite 214 then can communicate with operations and finance 218 of a tobacco product manufacturer, via satellite dish 220 over satellite communications link 222. Advantageously, the exemplary system 200 allows the tobacco product manufacturer the flexibility and efficiency to support tobacco farming in both traditional and new and expanding areas by eliminating the transport and consignment costs and by providing a secure market and delivery location for the tobacco farms 202, 204, 206 and 208.

In FIGS. 3-5B, the mobile receiving station 210 includes the trailer 704 and toter 706, loading ramp 1002, conveyer 1004, optional moisture sensor 1006 (e.g., a MalCam conveyer for determining moisture and density measurements), scale 1008, 90° transfer 1005, and unloading ramp 1010.

Figure 6:
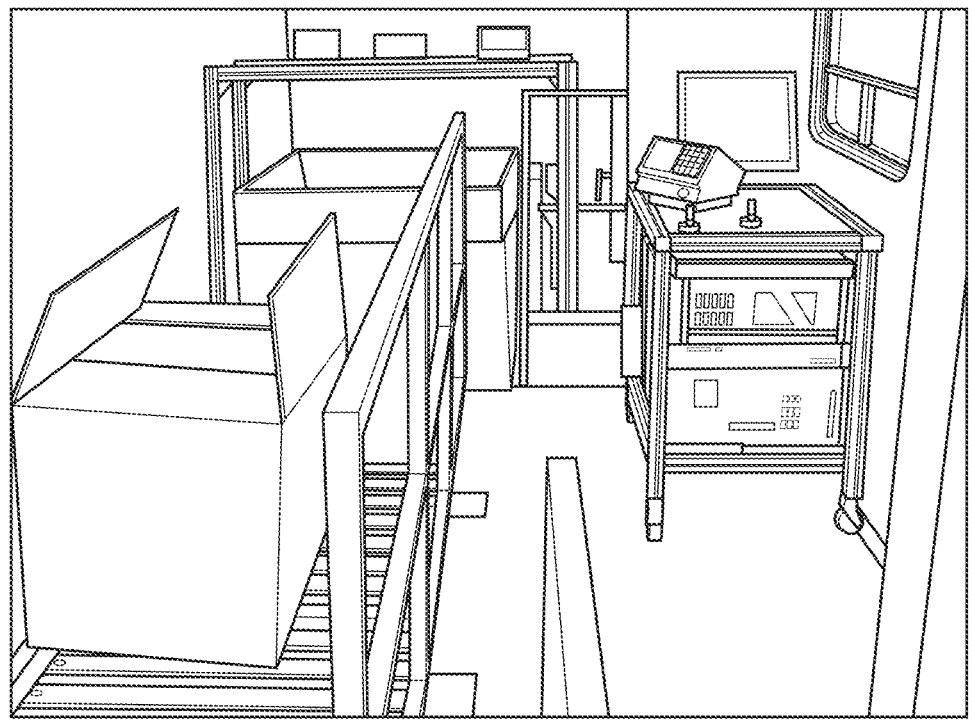
FIGS. 6-32 illustrate exemplary features of the mobile tobacco leaf receiving station of FIGS. 3-5B, according to exemplary embodiments of the present invention.
Figure 23:
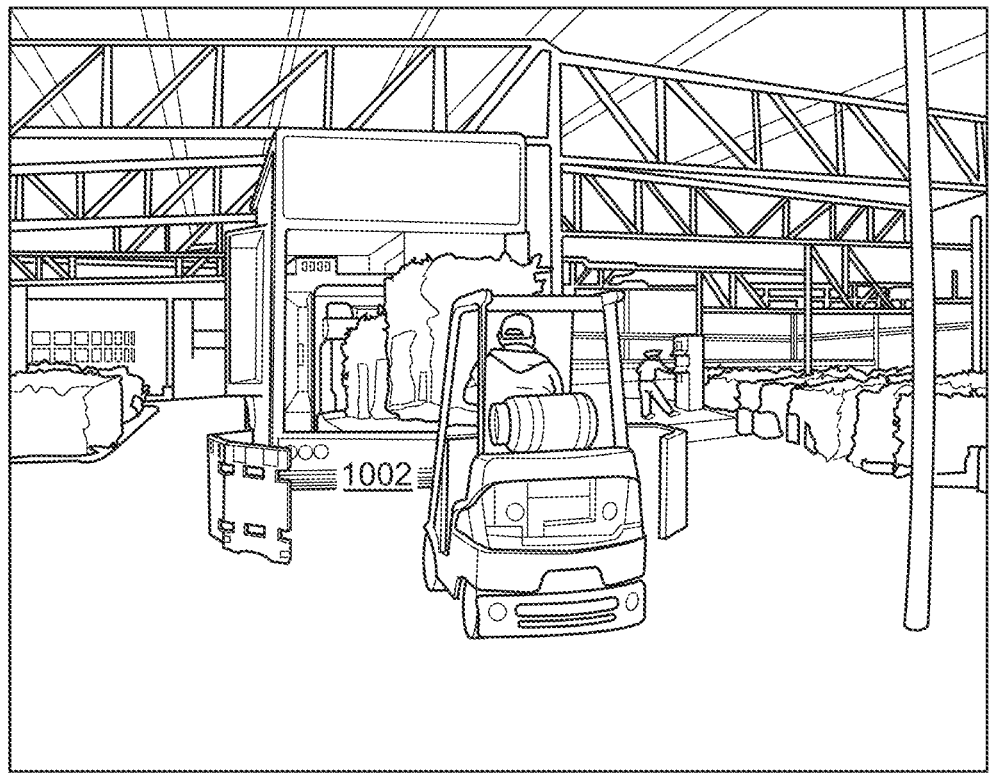
Figure 24:
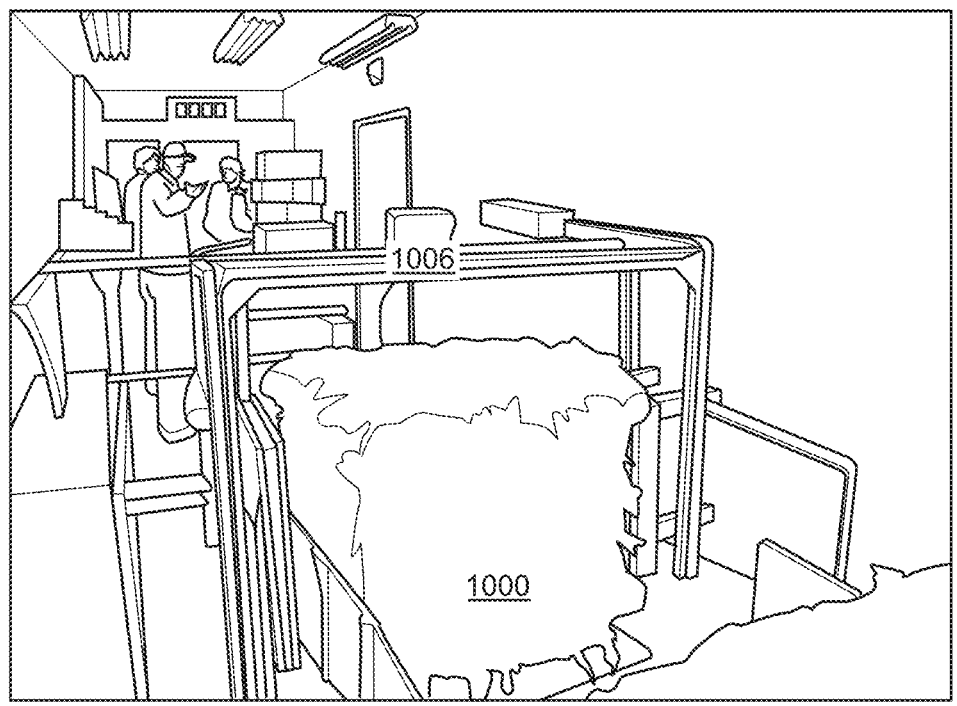
Figure 25:

FIGS. 5A and 5B are top and side views, respectively, of the mobile tobacco leaf receiving station of FIGS. 3-5B. As shown in FIGS. 5A and 5B, bales 1000 can be moved from a farmer's storage area 1001 for receiving at ramp 1002, and as further illustrated in FIGS. 20, and 23-24. The receiving ramp 1002 can operate manually as bales 1000 are pushed in or automatically via powered rollers. The bales 1000 can include a "buy coupon" having a unique identifier (e.g., using barcode and scanner technology) for uniquely identifying each bale 1000. In this way, once the weight and, optionally, the moisture content are determined, the buy coupon can be scanned to uniquely associate this determined information with each bale 1000. The information can be processed by computer 1009 and displayed in real-time, including a running total, for the operator and the farmer on display 1011 in area 1007 of the mobile receiving station 210, as shown in FIG. 6. The area 1007 can be also used by the grader to grade the bale 1000, as shown in FIG. 25, for determining the payment to be made to the farmer. All such information can be processed by a server 1013 for uplink to the satellite 214. A power source 1015 for the satellite link is also provided.

FIGS. 6-32 illustrate exemplary features of the mobile tobacco leaf receiving station of FIGS. 3-5B, according to exemplary embodiments of the present invention.

Figure 27:
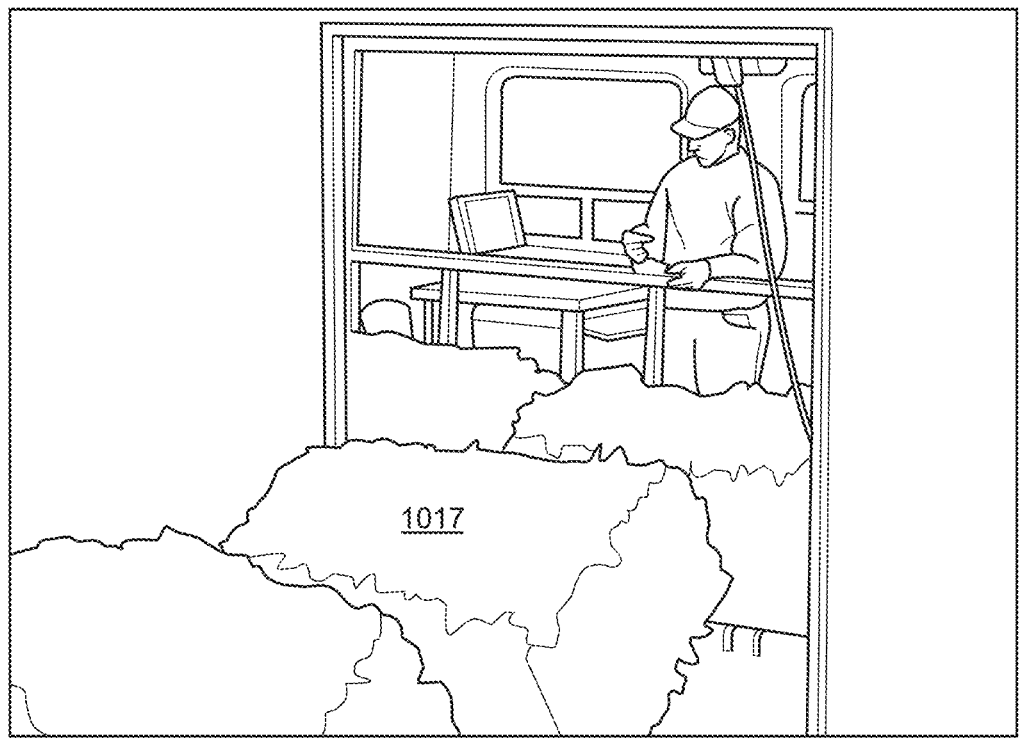
Figure 28:
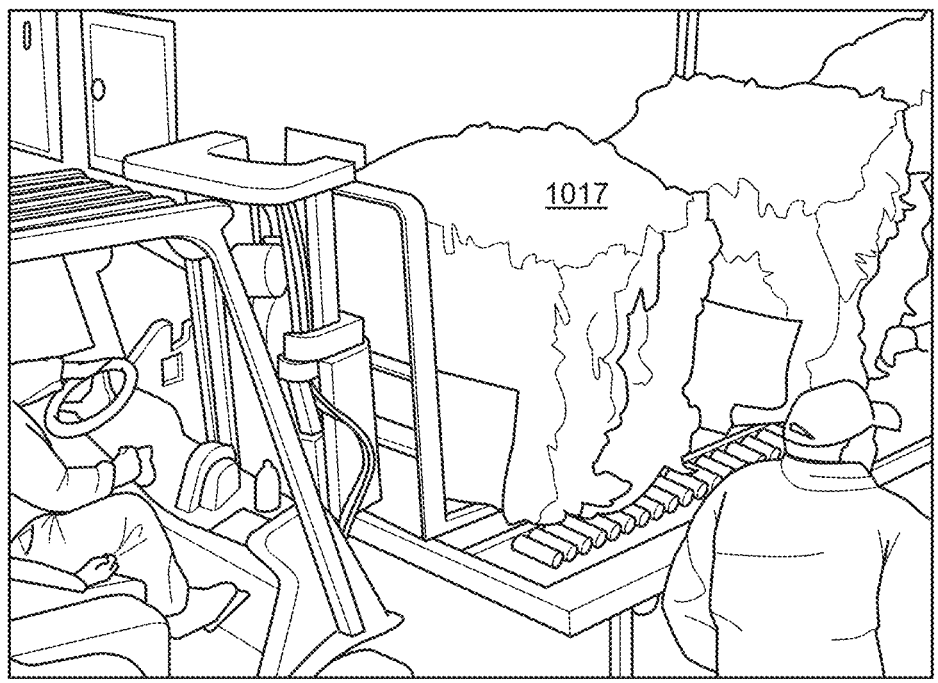
Figure 29:
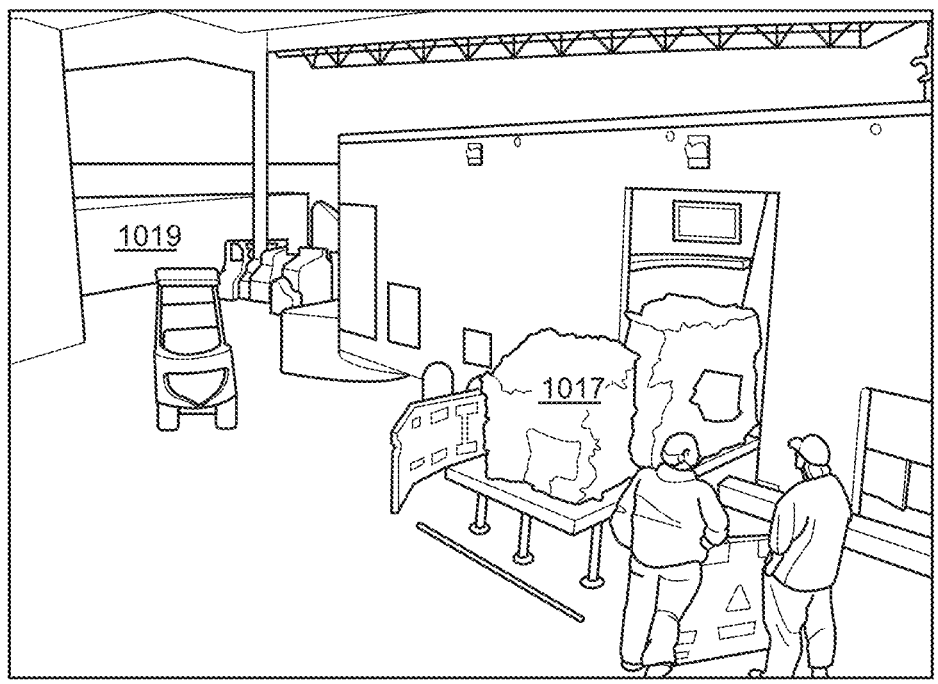

Once the bale 1000 has been weighed and graded, and optionally analyzed for moisture content, the processed bale 1017 exits via ramps 1005 and 1010 with such information added to the buy coupon or the like, as shown in FIG. 27. The exemplary system can then process such information for numerous bales 1017 for generating a bill of lading for sending the bales 1017 to a transport area 1019, for example, for truck transport, as shown in FIGS. 28-29, for transportation for further processing, such to a stemmery for stemming, and the like. Referring again to FIGS. 2 and 5A, although the noted information can be processed via the server 1013 and transmitted via the satellite 214, such information can also be processed via other means, such as phone line connections, local area network (LAN) connections, tape backup, CD ROM, and the like, as will be appreciated by those skilled in the relevant art(s).

Both the Mobile Receiving Station (MRS) and toter 706 home can include shore power capabilities as well as diesel generators. The shore power connection for the MRS may be provided on the driver's side, just aft of the gooseneck. The toter 706 home connection is on the passenger side near the aft end of the office.

The MRS can include a 20 kW diesel generator (DG) having a 45 gallon fuel tank (not shown). The 20 kW generator is capable supporting MRS operations including HVAC in the event that shore power is lost or unavailable. The DG can be mounted under the working deck with an external access on the driver side of the trailer 704 near the shore power connection. A remote start switch can be located in the MRS.

A jack stand actuator may be located under the gooseneck on the driver's side of the trailer 704. The actuator can allow some independent adjustment of the jacklegs.

Figure 7:
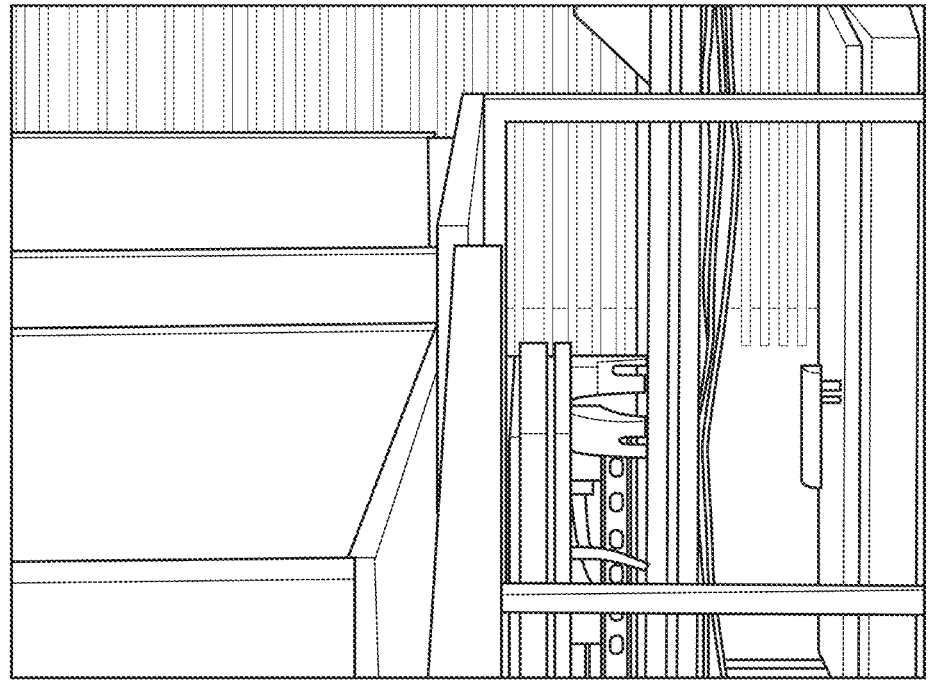
Figure 8:
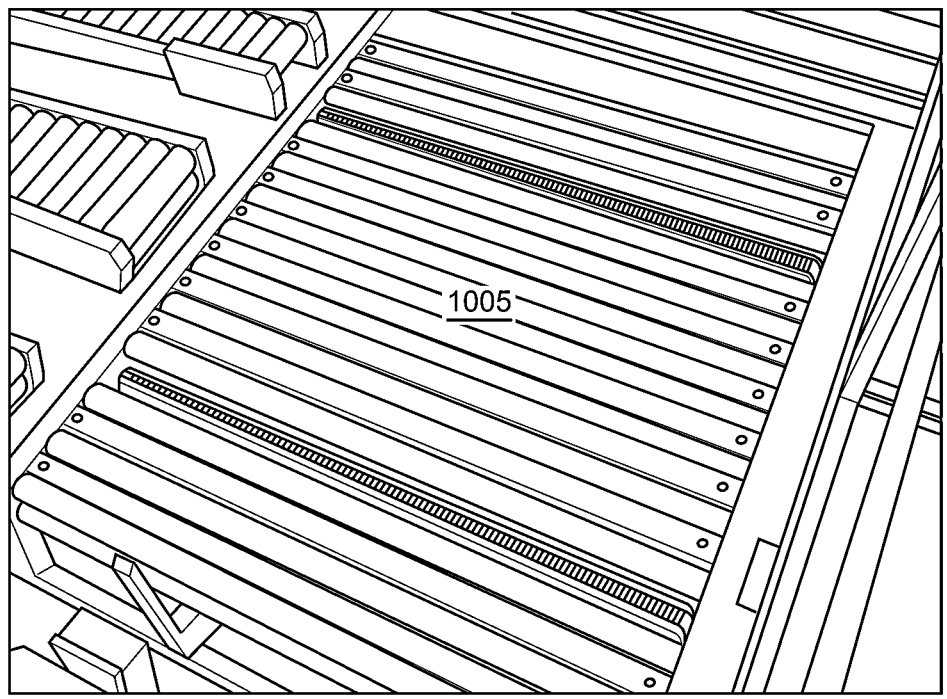

The MRS includes slide-outs for loading and unloading and which remain in the "In" position during transit, and overnight after receiving operations have been secured. The MRS trailer 704 slide-out can be in the "Out" position in order for the line to receive tobacco. In FIGS. 7 and 8, the MRS Trailer 704 Slide-out Extended, "Out" Position, as seen from guard rail and line perspectives are respectively shown.

Figure 9:
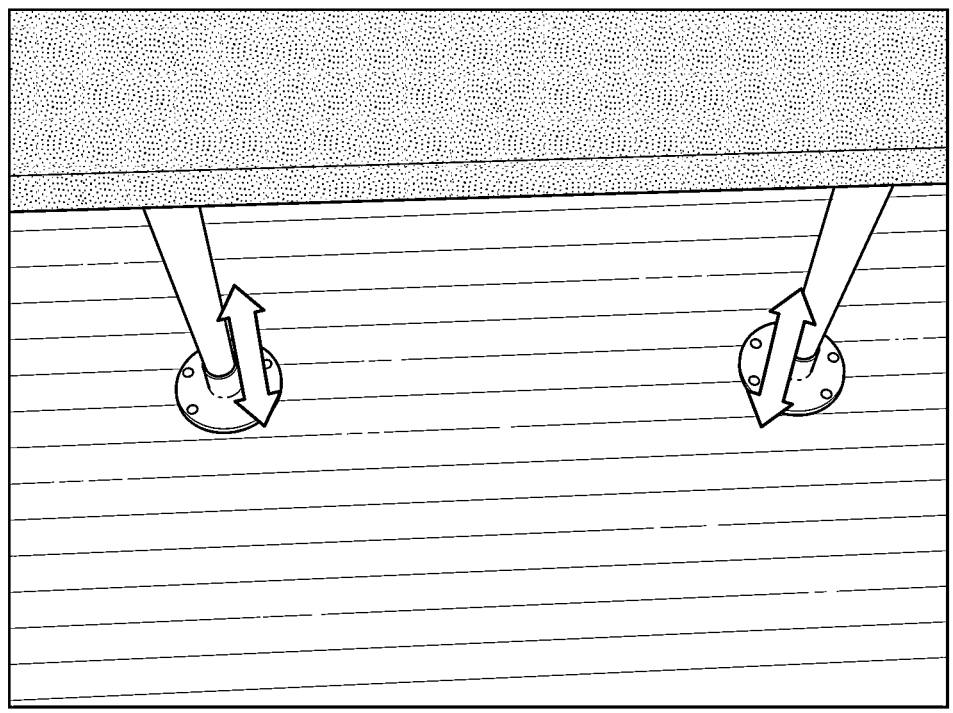

The toter home slide-out may be a 1-touch switch, which can automatically extend or retract the slide-out. The toter home work table can be removed and stowed before the slide-out can be retracted, as shown in FIG. 9. The table legs insert into the deck receptacles. The legs may also be detached from the table tabletop for ease of storage.

Referring again to FIGS. 4-5B, the on/off load ramps 1002 and 1010 can include two winch lowered doors with three sets of gravity rollers each. The on-load ramp 1002 is to be lowered to a height that can allow gravity to roll the bale down onto the MalCam conveyor 1006 for the optional moisture content determination. The off-load ramp 1010 is to be lowered to a height that can allow gravity to roll the bale off the line to a pick-up position. The ramps are lowered to the appropriate heights and the support legs are installed.

Figure 10:
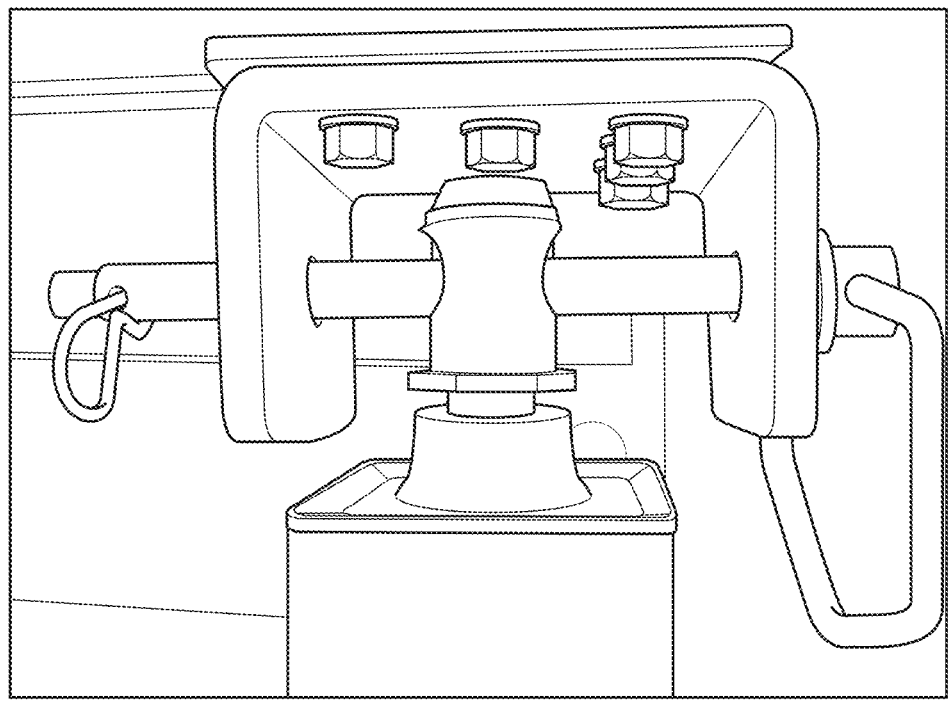
Figure 11:
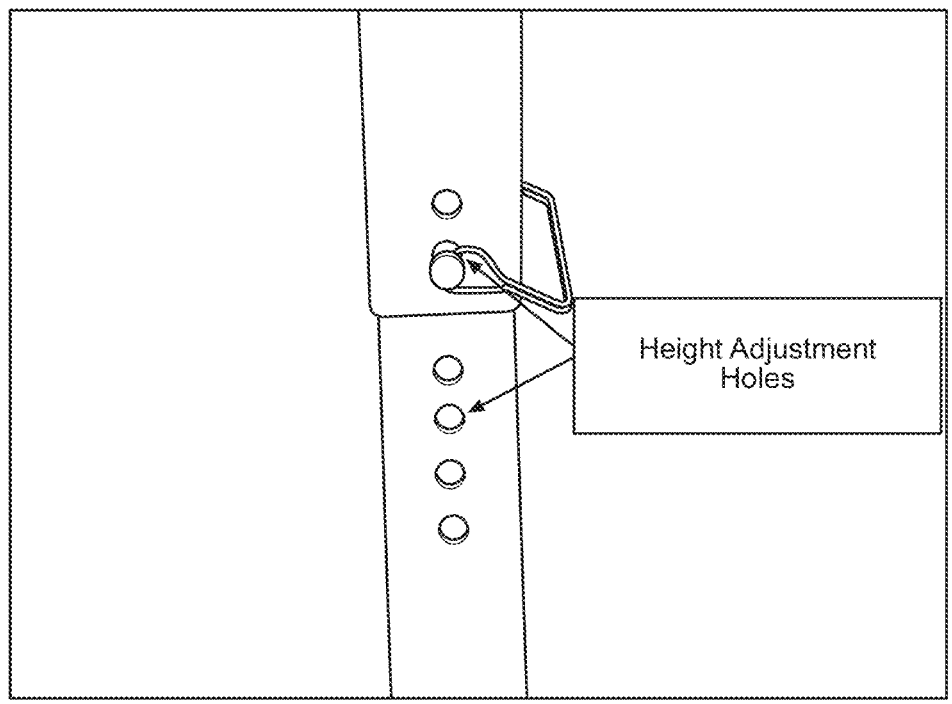
Figure 12:
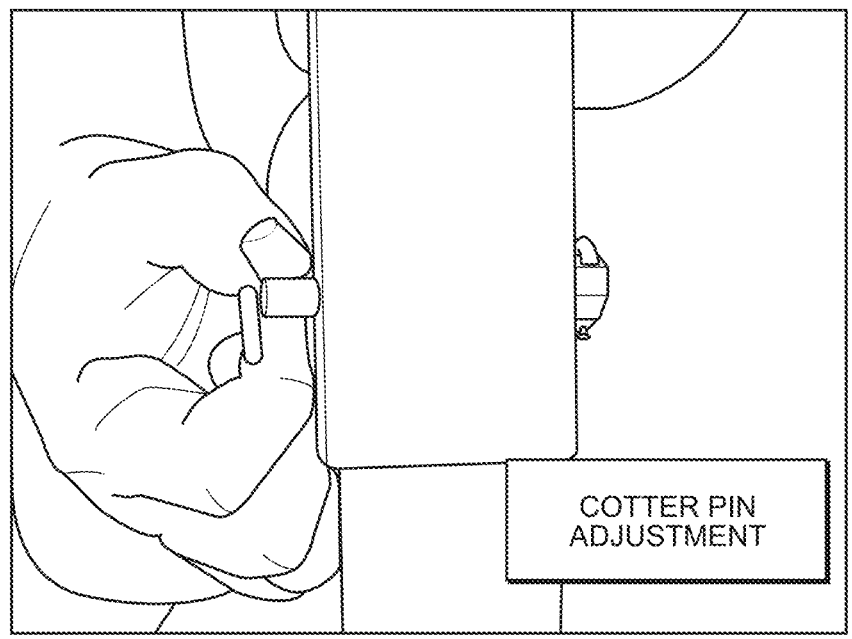

The ramps 1002 and 1010 are raised and lowered via electric winch. Hand held winch controllers are plugged into receptacles on the outside of the MRS trailer 704. Prior to reaching the appropriate heights, the support legs are installed, and the ramps are carefully lowered until firm contact with the ground is made. The support legs are installed via lynch and cotter pins, as shown in FIG. 10. Support legs can be adjusted for uneven ground with support leg and locking pin adjustments, as shown in FIGS. 11 and 12.

Figure 13:
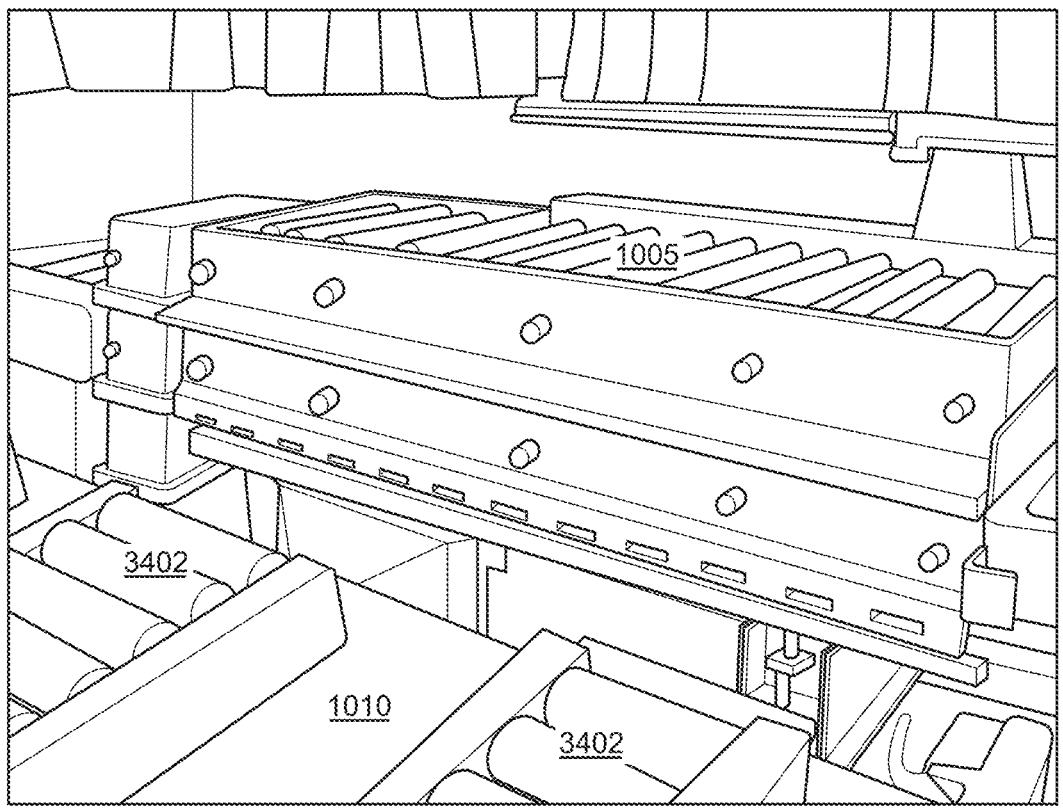
Figure 14:
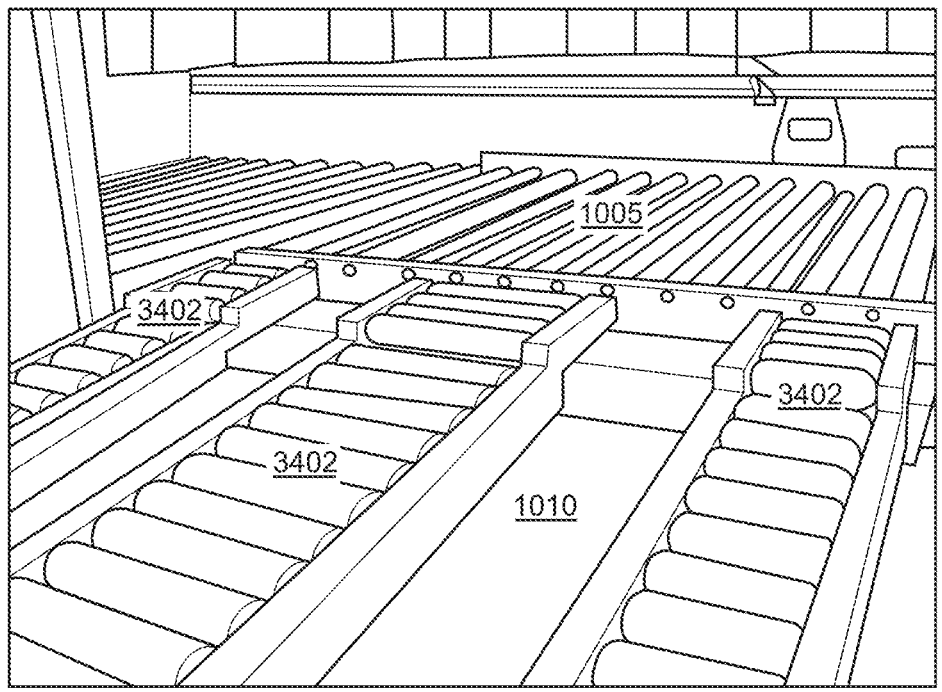
Figure 15:
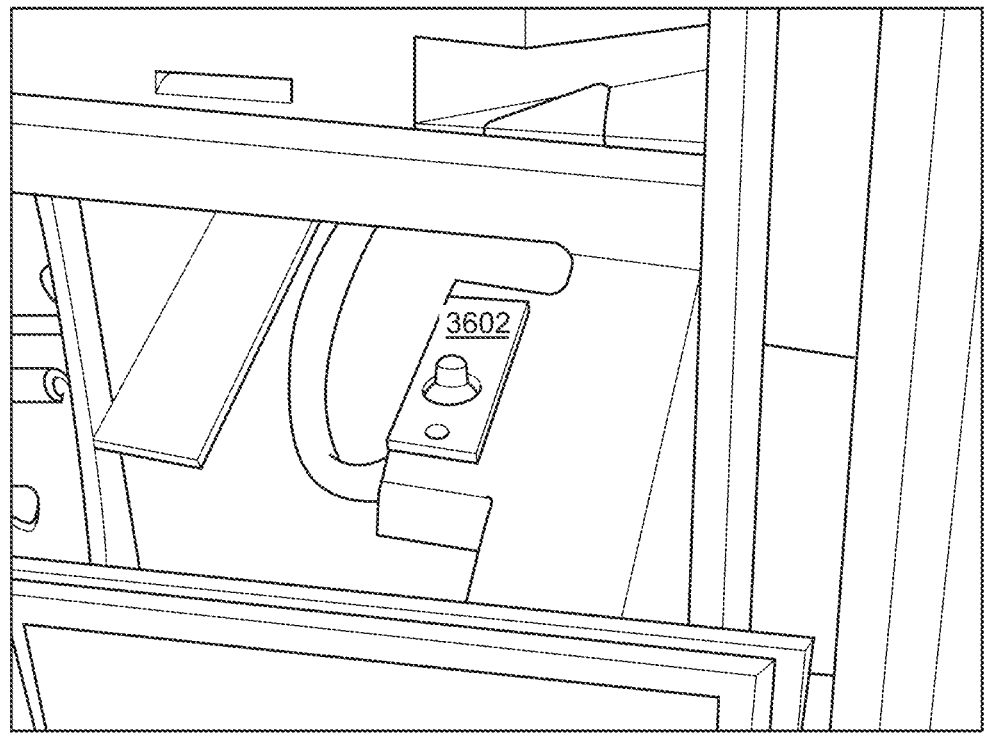
Figure 16:
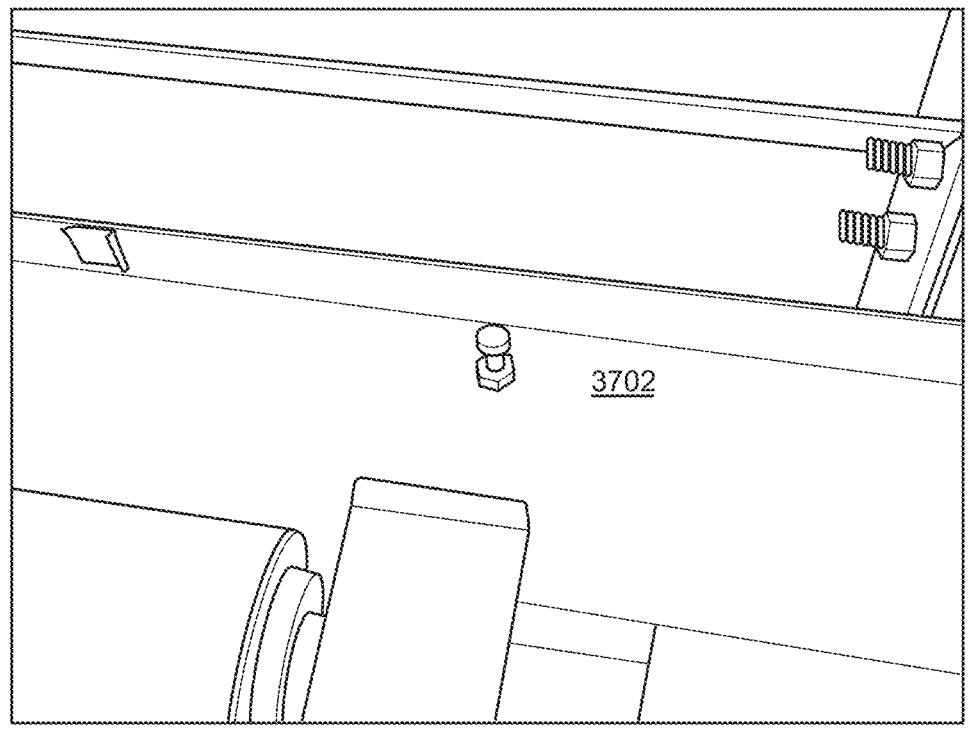
Figure 17:
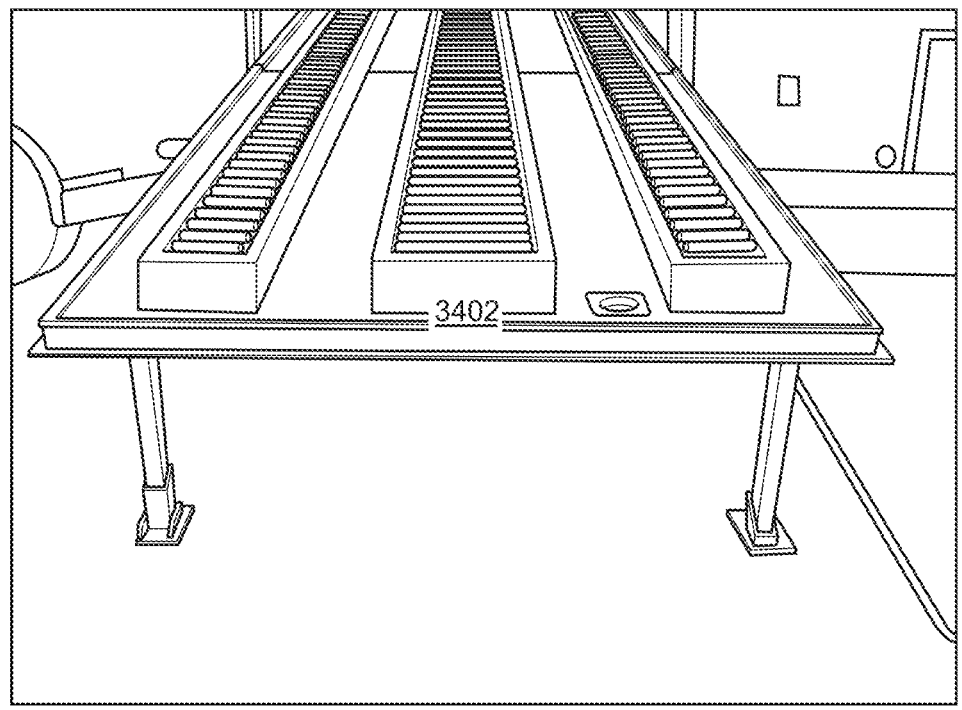
Figure 18:
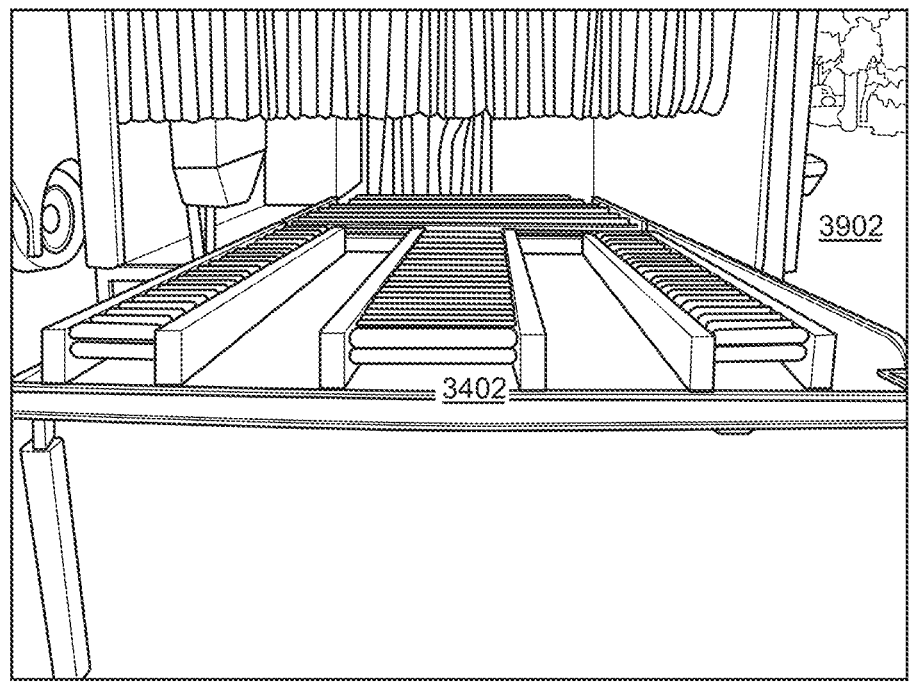
Figure 19:
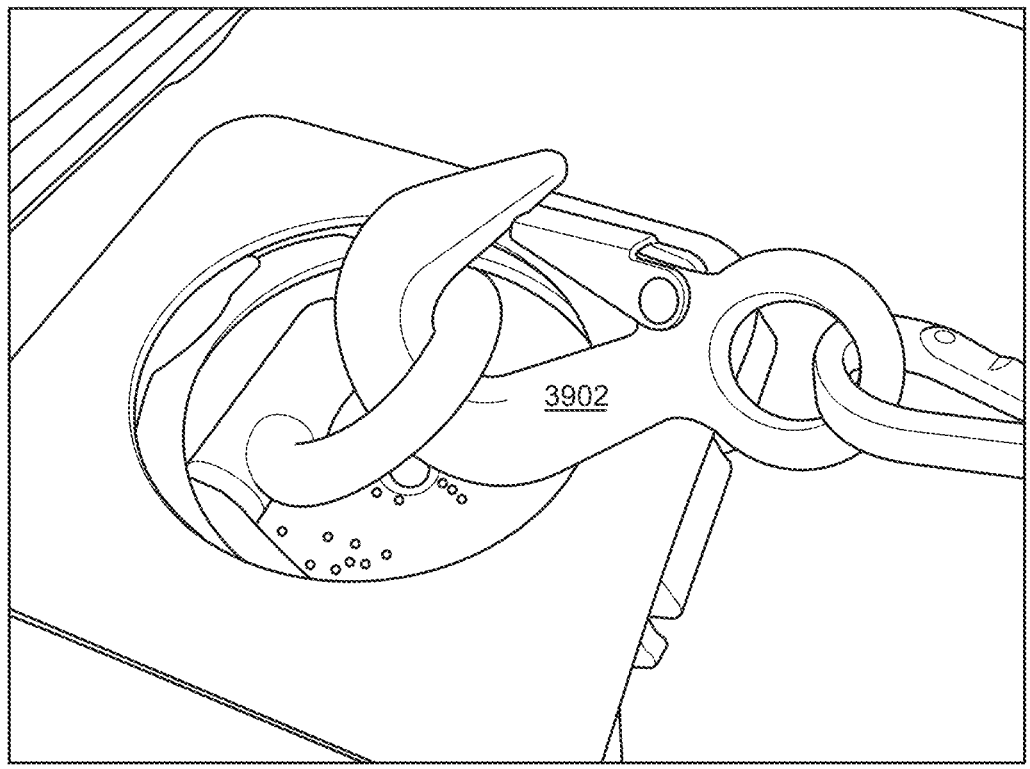

A set of transition rollers 3402 forms a bridge between the 90° transfer 1005 and the off-load ramp 1010. The transition rollers 3402 stow in an upright position, as shown in FIG. 13, and lower to a down position during receiving operations, as shown in FIG. 14. A series of safety switches have been installed to prevent raising the off-load ramp 1010 while the transition rollers 3402 are down, a separate safety switches 3602 and 3702 prevent operation of the 90° Transfer 1005 while the transition rollers 3402 are up, as shown in FIGS. 15 and 16. Also, it is important that the winch cable 3902 be hooked to the ramps, as shown in FIGS. 17-19, in order to avoid damaging the ramps during lift operations.

Figure 20:
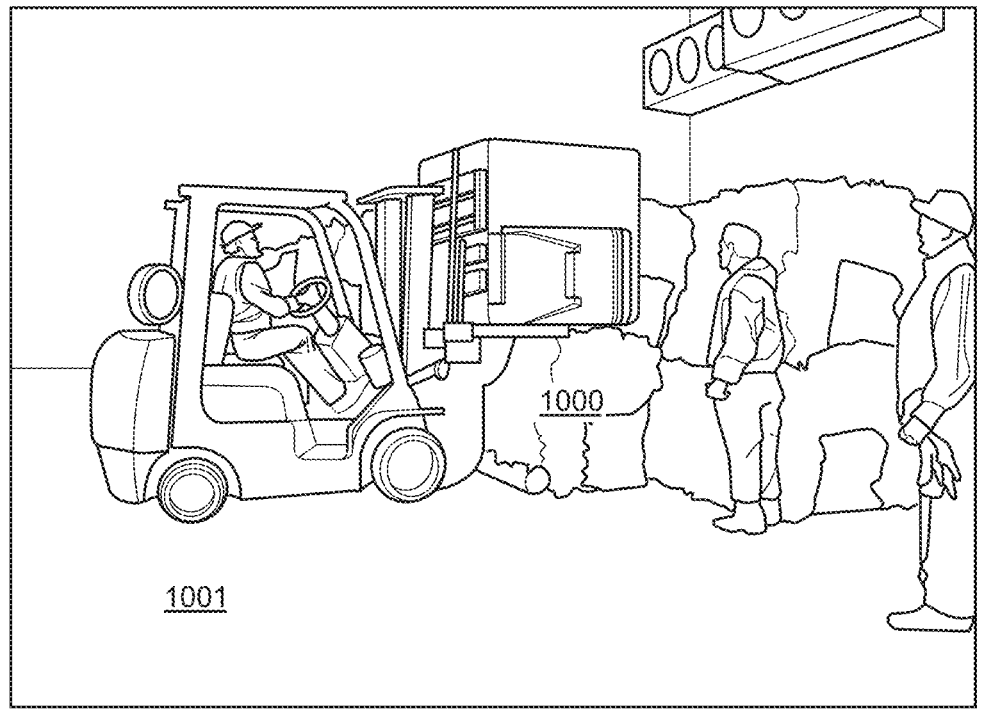
Figure 21:
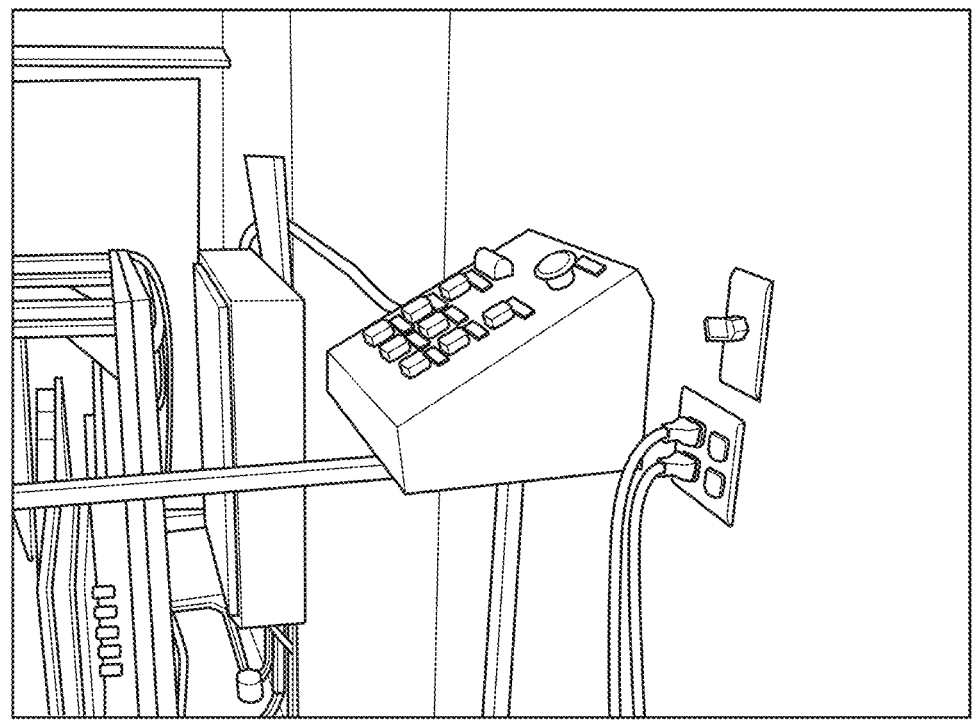
Figure 22:
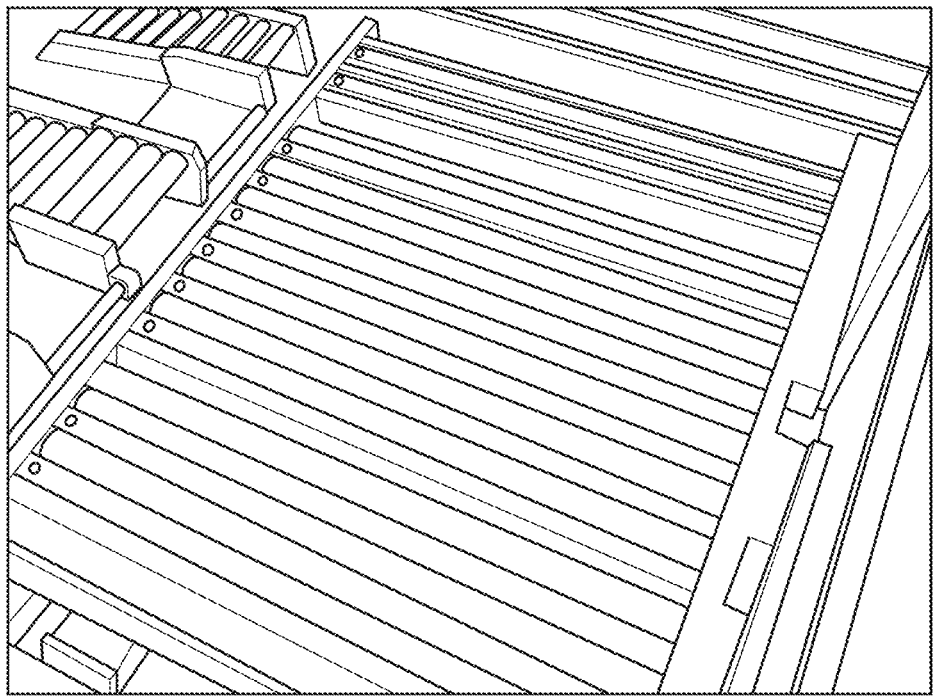

The MRS can operate in a similar manner as brick and mortar receiving stations, as shown in FIG. 20. The line can include a controller as used in such stations, as shown in FIG. 21. An additional control feature has been added for the 90° transfer 1005, as shown in FIG. 22.

Once power is established, the slide-out, transition, and the on-load/off-load ramps 1002 and 1010 are in place the line is ready to receive tobacco. Bales can be loaded onto the on-load gravity rollers at the rear of the trailer 704, as shown in FIG. 17. The bales can roll onto the MalCam conveyor 1006 for optional moisture content determination and advance to the scale 1008 where it can stop for weight. The weigh-master can advance the bale to the 90° transfer 1005 where it can be graded using known methods.

The 90° transfer 1005 can engage the bale and drive it off the line for 10 seconds. The bale can travel across the transition onto the off-load ramp 1010, as shown in FIGS. 18 and 27-29, and wait for pick-up.

Figure 26:
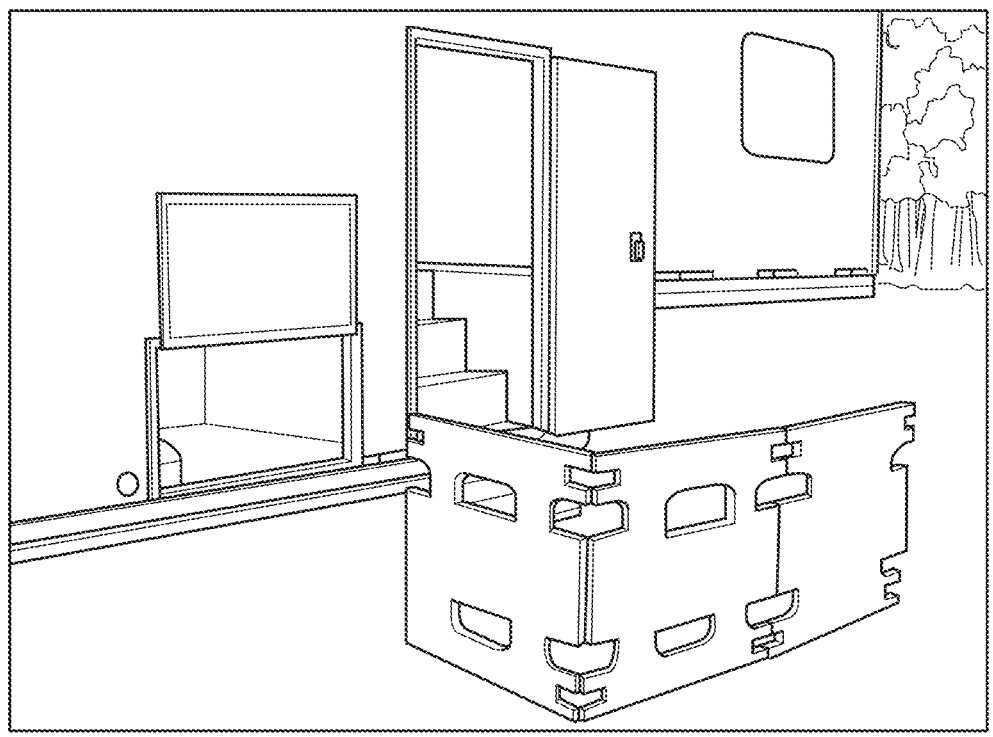

A safety barrier should be placed outside the MRS. This barrier is to protect growers from forklift traffic and bales, as shown in FIG. 26. In the event of chemical exposure, a safety shower/eye wash is in the toter home. The toter home includes a fire extinguisher. The MRS has external lighting to support operation during periods of reduced visibility.

Figure 30:
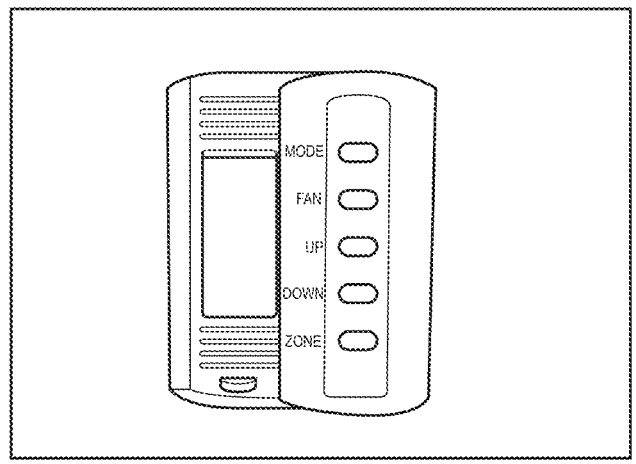
Figure 31:
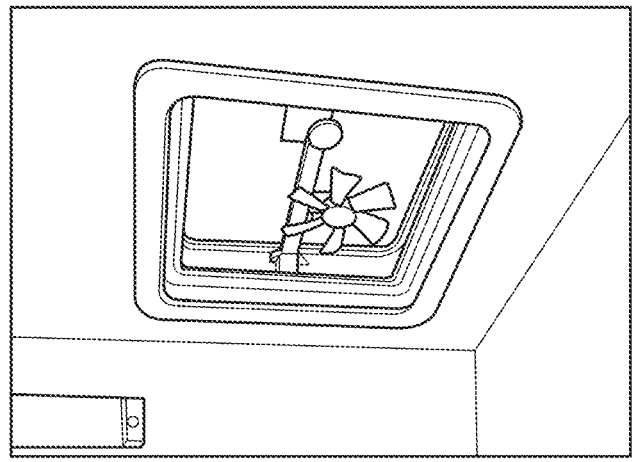
Figure 32:
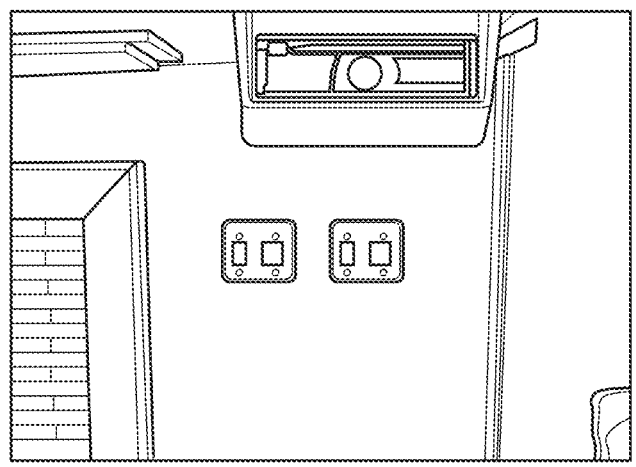

The heating and cooling controls on the MRS and toter can be similar to those used in a residential home. The toter home also has a furnace and a ventilation system. The furnace is deck mounted and controlled from the thermostat, as shown in FIG. 30. The ventilation system has separate controls and includes two sets of windows and fans, as shown in FIGS. 31 and 32.

Figure 33:
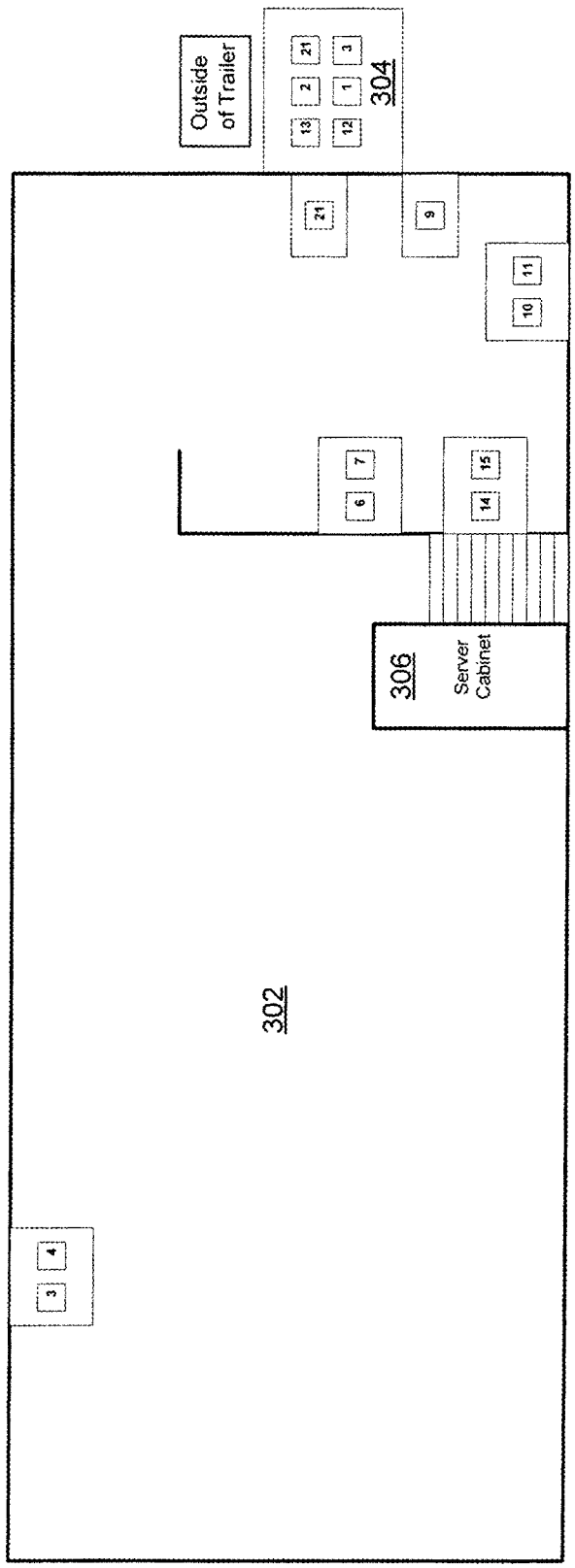
FIGS. 33-34 illustrate exemplary communications connections diagrams of a mobile tobacco leaf receiving station, according to exemplary embodiments of the present invention.
Figure 34:
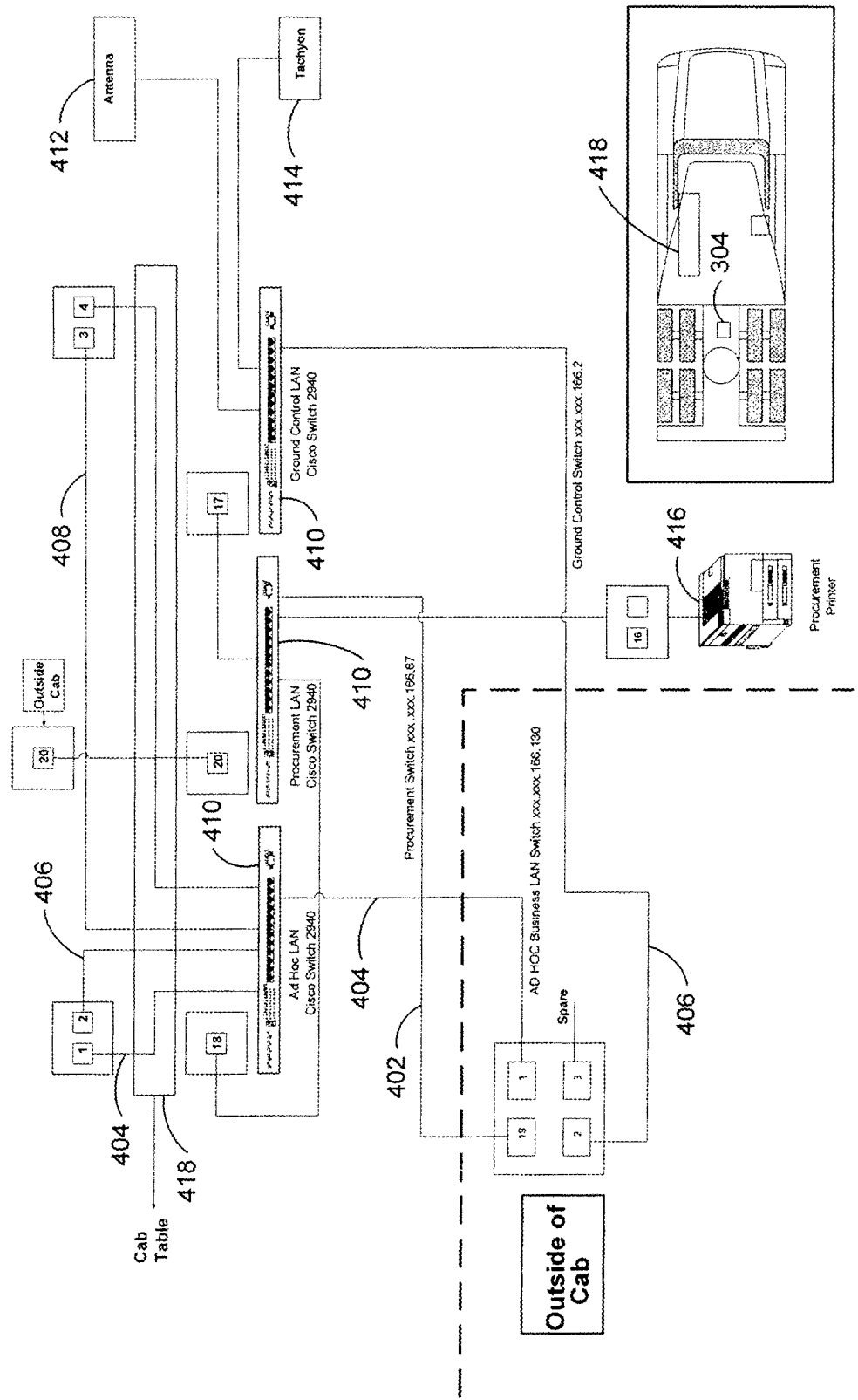
Figure 35:
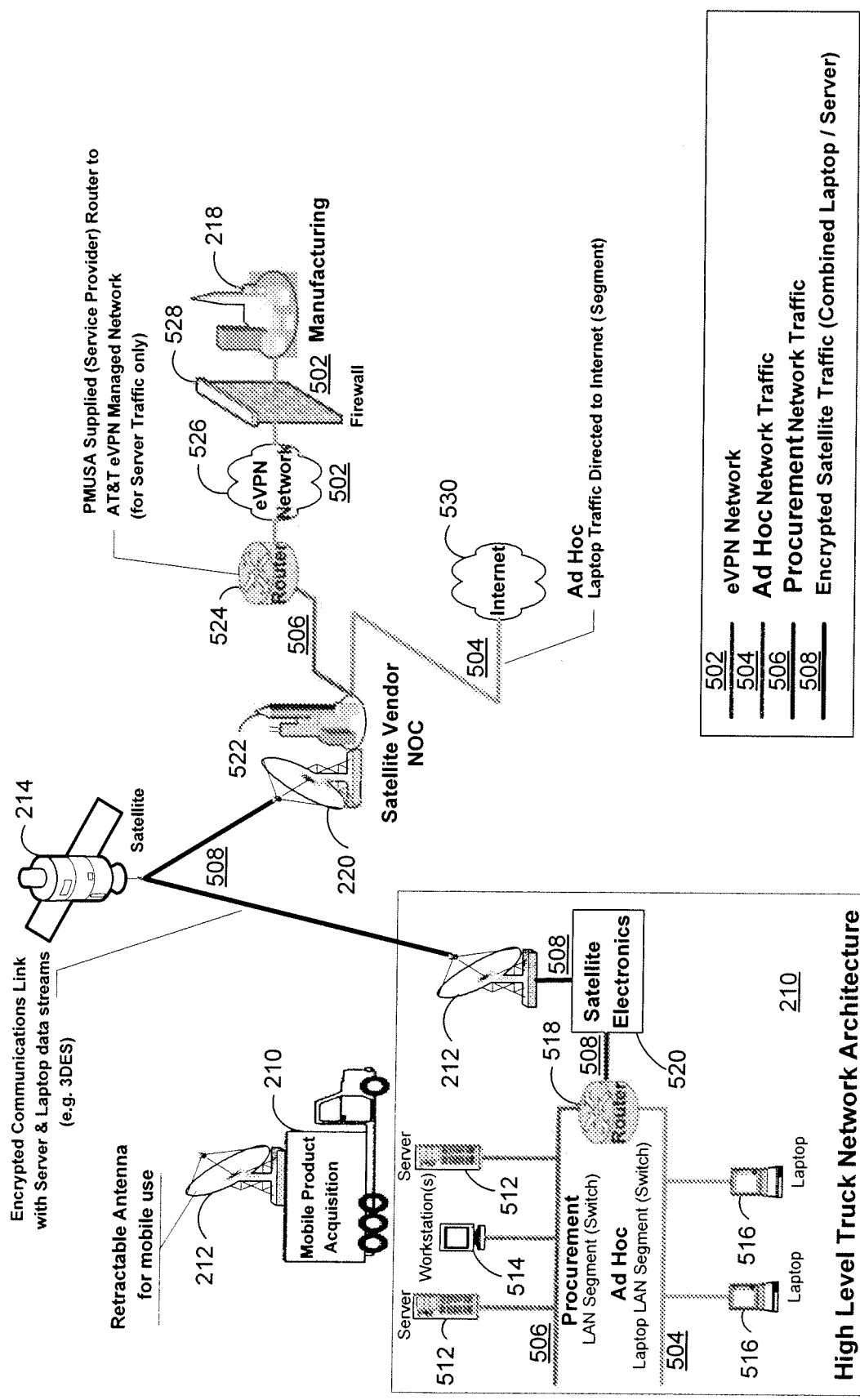
FIGS. 35-38 illustrate exemplary system structural diagrams, according to exemplary embodiments of the present invention.
Figure 36:
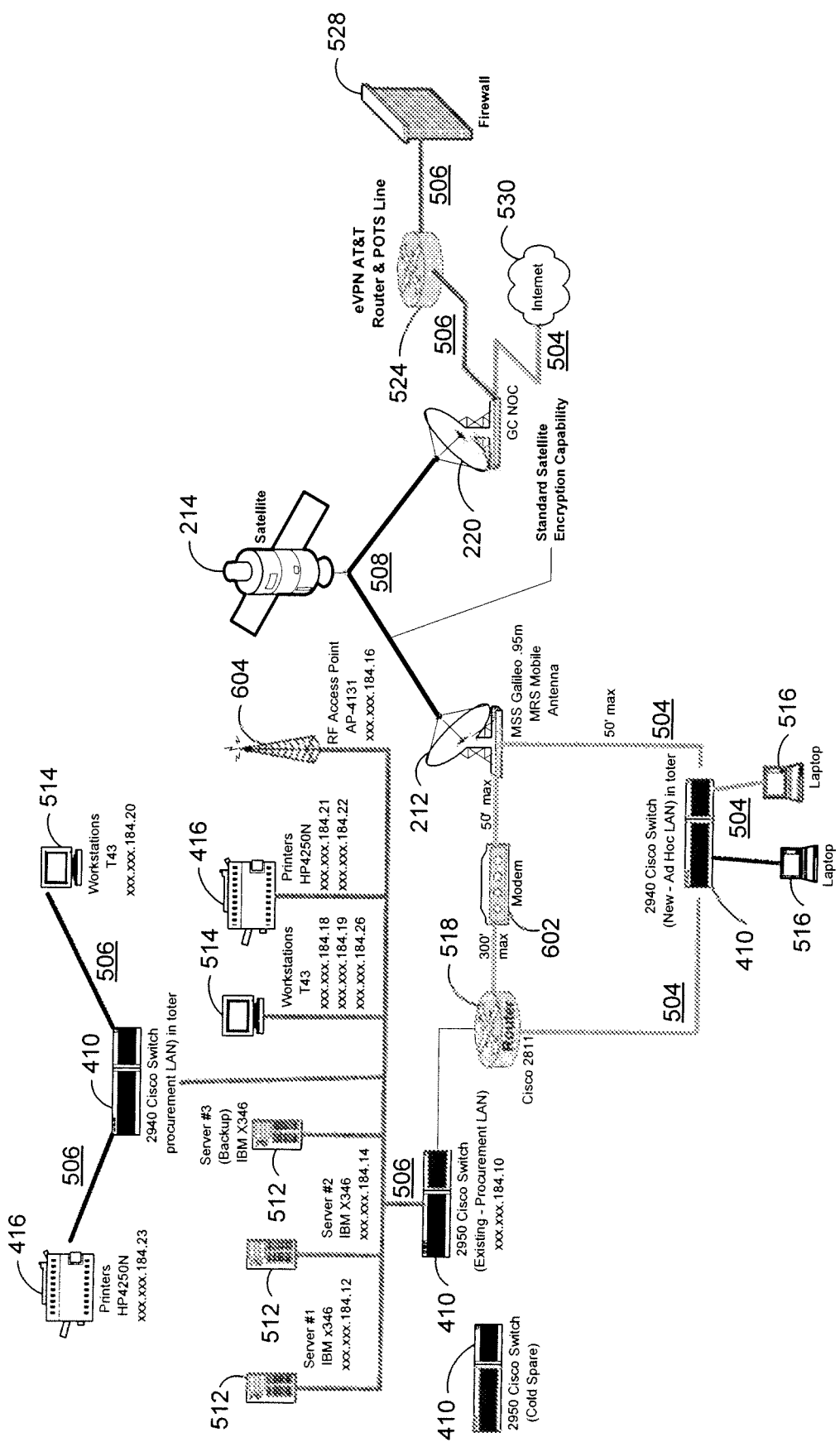
Figure 37:
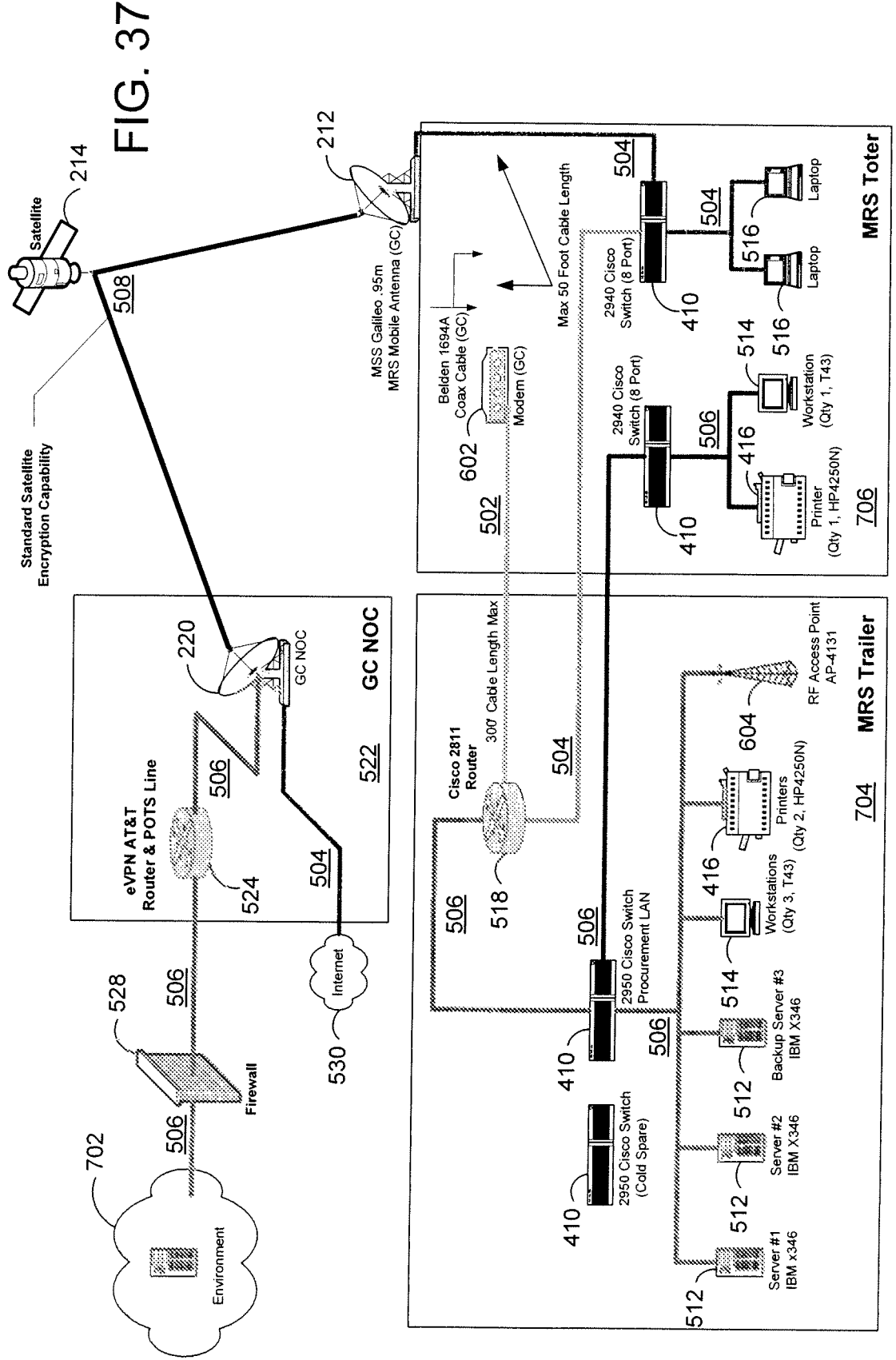

FIGS. 33-34 illustrate exemplary communications connections diagrams of a mobile tobacco leaf receiving station, according to exemplary embodiments of the present invention. In an exemplary embodiment, the mobile receiving station can be configured in the form of a truck, having a trailer, toter, and cab.

FIGS. 35-38 illustrate exemplary system structural diagrams, according to exemplary embodiments of the present invention. In FIGS. 35-38, eVPN Network links 502, Ad Hoc Network Traffic links 504, Procurement Network Traffic links 506, and Encrypted Satellite 214 Traffic links 508 are used to connect the various system components. As shown in FIG. 35-38, servers 512, workstations 514, laptops 516, router 518, satellite electronics 520, satellite vendor NOC 522, router 524, eVPN network 526, firewall 528, the Internet 530, modem 602, wireless access point 604, manufacturing computing environment 702, and manufacturing servers 802 are connected via the noted cables and connections.

Figure 38:
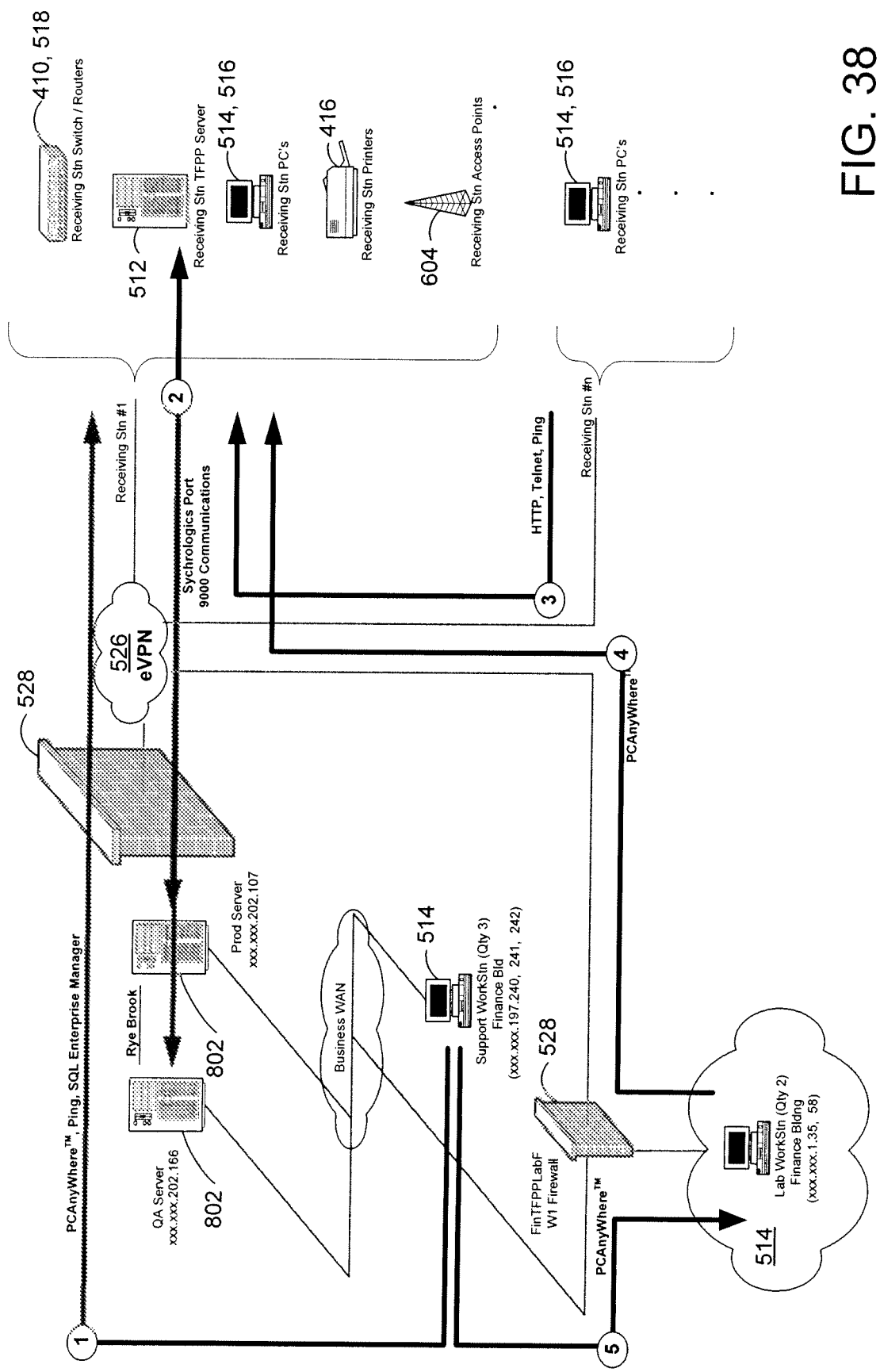

In FIG. 38, firewall connections are shown, including personal computers and servers in the receiving stations running a suitable application, such as PCAnyWhere™ host capability (e.g., with no client), and including basic connectivity available from receiving station to receiving station possible at the personal computer (e.g., using HTTP, Telnet, Ping to other devices at the receiving stations, etc.).

In view of the above, provided is a system for facilitating tobacco purchasing from a tobacco farmer. The system includes a mobile leaf tobacco receiving station for receiving tobacco leaf bales at a location of a tobacco farmer, means for determining bale weight and tobacco leaf grade and, optionally, moisture content for the received tobacco leaf bales and means for transmitting information relating to the optionally determined moisture content, bale weight, and tobacco leaf grade of the received tobacco leaf bales from the mobile receiving station to a tobacco product manufacturing facility over a communications link.

In another form, provided is a mobile receiving station for receiving and processing leaf tobacco at a location of a tobacco farmer. The mobile receiving station includes means for determining bale weight and tobacco leaf grade and, optionally, moisture content, for the received tobacco leaf bales at the location of the tobacco farmer and means for transmitting information relating to the optionally determined moisture content, bale weight, and tobacco leaf grade of the received tobacco leaf bales from the mobile receiving station to a tobacco product manufacturing facility over a communications link.

The systems and mobile receiving stations disclosed herein may be used in a method of facilitating tobacco purchasing from a tobacco farmer. In one form, the method includes the steps of providing a mobile leaf tobacco receiving station for receiving tobacco leaf bales at a location of the tobacco farmer, determining bale weight and tobacco leaf grade and, optionally, moisture content, for the received tobacco leaf bales at the location of the tobacco farmer and transmitting information relating to the optionally determined moisture content, bale weight, and tobacco leaf grade of the received tobacco leaf bales from the mobile receiving station to a tobacco product manufacturing facility over a communications link.

In another form, a method for reducing costs of tobacco selling and buying is provided. The method contemplated herein includes the steps of moving a tobacco receiving station to a location of a tobacco farmer for receiving tobacco leaf at the location of the tobacco farmer, determining weight, and grade of the received tobacco leaf and, optionally, moisture content, via the receiving station and paying the farmer for the received tobacco leaf based on the determined moisture content, weight, and grade of the received tobacco leaf. In one form, the step of determining grade of the received tobacco leaf is conducted in the presence of the tobacco farmer, enabling the tobacco farmer to receive direct feedback that may be used to improve a future tobacco crop.

Although the exemplary embodiments are described in terms of a mobile receiving station and system for processing leaf tobacco, in further exemplary embodiments the mobile receiving station and system can be applied to any other suitable products that require processing, as will be appreciated by those skilled in the relevant art(s).

Although the exemplary embodiments are described in terms of a mobile receiving station in the form of a truck vehicle, in further exemplary embodiments other vehicles, such as planes, boats, and the like, can be employed as mobile receiving stations, as will be appreciated by those skilled in the relevant art(s).

The above-described devices and subsystems of the exemplary embodiments can include, for example, any suitable servers, workstations, PCs, laptop computers, PDAs, Internet appliances, handheld devices, cellular telephones, wireless devices, other devices, and the like, capable of performing the processes of the exemplary embodiments. The devices and subsystems of the exemplary embodiments can communicate with each other using any suitable protocol and can be implemented using one or more programmed computer systems or devices.

One or more interface mechanisms can be used with the exemplary embodiments, including, for example, Internet access, telecommunications in any suitable form (e.g., voice, modem, and the like), wireless communications media, and the like. For example, employed communications networks or links can include one or more wireless communications networks, cellular communications networks, G3 communications networks, Public Switched Telephone Network (PSTNs), Packet Data Networks (PDNs), the Internet, intranets, a combination thereof, and the like.

It is to be understood that the devices and subsystems of the exemplary embodiments are for exemplary purposes, as many variations of the specific hardware used to implement the exemplary embodiments are possible, as will be appreciated by those skilled in the relevant art(s). For example, the functionality of one or more of the devices and subsystems of the exemplary embodiments can be implemented via one or more programmed computer systems or devices.

To implement such variations as well as other variations, a single computer system can be programmed to perform the special purpose functions of one or more of the devices and subsystems of the exemplary embodiments. On the other hand, two or more programmed computer systems or devices can be substituted for any one of the devices and subsystems of the exemplary embodiments. Accordingly, principles and advantages of distributed processing, such as redundancy, replication, and the like, also can be implemented, as desired, to increase the robustness and performance of the devices and subsystems of the exemplary embodiments.

The devices and subsystems of the exemplary embodiments can store information relating to various processes described herein. This information can be stored in one or more memories, such as a hard disk, optical disk, magneto-optical disk, RAM, and the like, of the devices and subsystems of the exemplary embodiments. One or more databases of the devices and subsystems of the exemplary embodiments can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases thereof.

All or a portion of the devices and subsystems of the exemplary embodiments can be conveniently implemented using one or more general purpose computer systems, microprocessors, digital signal processors, micro-controllers, and the like, programmed according to the teachings of the exemplary embodiments of the present inventions, as will be appreciated by those skilled in the computer and software arts.

In view thereof, in one form there is provided a computer program product for facilitating tobacco purchasing from a tobacco farmer via a mobile leaf tobacco receiving station for receiving tobacco leaf at a location of a tobacco farmer, including one or more computer readable instructions embedded on a tangible computer readable medium and configured to cause one or more computer processors to perform the steps of determining bale weight, tobacco leaf grade and, optionally, moisture content, for the received tobacco leaf bales at the location of the tobacco farmer and transmitting information relating to the optionally determined moisture content, bale weight, and tobacco leaf grade of the received tobacco leaf bales from the mobile receiving station to a tobacco product manufacturing facility over a communications link.

Appropriate software can be readily prepared by programmers of ordinary skill based on the teachings of the exemplary embodiments, as will be appreciated by those skilled in the software art. Further, the devices and subsystems of the exemplary embodiments can be implemented on the World Wide Web. In addition, the devices and subsystems of the exemplary embodiments can be implemented by the preparation of application-specific integrated circuits or by interconnecting an appropriate network of conventional component circuits, as will be appreciated by those skilled in the electrical art(s). Thus, the exemplary embodiments are not limited to any specific combination of hardware circuitry and/or software.

Stored on any one or on a combination of computer readable media, the exemplary embodiments of the present inventions can include software for controlling the devices and subsystems of the exemplary embodiments, for driving the devices and subsystems of the exemplary embodiments, for enabling the devices and subsystems of the exemplary embodiments to interact with a human user, and the like. Such software can include, but is not limited to, device drivers, firmware, operating systems, development tools, applications software, and the like. Such computer readable media further can include the computer program product of an embodiment of the present inventions for performing all or a portion (if processing is distributed) of the processing performed in implementing the inventions. Computer code devices of the exemplary embodiments of the present inventions can include any suitable interpretable or executable code mechanism, including but not limited to scripts, interpretable programs, dynamic link libraries (DLLs), Java classes and applets, complete executable programs, Common Object Request Broker Architecture (CORBA) objects, and the like. Moreover, parts of the processing of the exemplary embodiments of the present inventions can be distributed for better performance, reliability, cost, and the like.

As stated above, the devices and subsystems of the exemplary embodiments can include computer readable medium or memories for holding instructions programmed according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

Advantageously, the exemplary embodiments provide cost savings by avoiding brick-and-mortar receiving station operator charges. In addition, the farmers get immediate feedback and information regarding crop grade and immediate payment via issued checks or electronic funds transfers. Further, the farmers also avoid transportation costs of moving bales from the farm to the brick-and-mortar receiving station. Moreover, the exemplary embodiments provide a competitive advantage by providing the ability for on-the-spot purchase with farmers who have extra tobacco beyond commitment to others. This helps in short-crop years (e.g. during draught conditions) or when venturing with new types of tobacco.

While the present inventions have been described in connection with a number of exemplary embodiments, and implementations, the present inventions are not so limited, but rather cover various modifications, and equivalent arrangements, which fall within the purview of the present claims.

What is claimed:

1. A mobile receiving station comprising:
   a loading ramp configured to load at least one tobacco leaf bale into the mobile receiving station, the loading ramp arranged along a first direction;
   an unloading ramp configured to unload the at least one tobacco leaf bale from the mobile receiving station;
   a scale configured to measure a bale weight of the at least one tobacco leaf bale; and
   a conveyor belt and a lateral transfer, wherein the conveyor belt is configured to receive the at least one tobacco leaf bale from the loading ramp, the lateral transfer is configured to receive the at least one tobacco leaf bale from the conveyor belt and transfer the at least one tobacco leaf bale to the unloading ramp, and the unloading ramp is further configured to unload the at least one tobacco leaf bale from the mobile receiving station, the unloading ramp arranged in a second direction different from the first direction of the loading ramp.

2. The mobile receiving station of claim 1, further comprising:

a moisture sensor configured to determine moisture content of the at least one tobacco leaf bale; and a communications link configured to communicate with a tobacco product manufacturing facility.

3. The mobile receiving station of claim 2, further comprising:

a scanner configured to read a unique identifier corresponding to the at least one tobacco leaf bale.

4. The mobile receiving station of claim 3, further comprising:

at least one processor configured to execute computer readable instructions to, assign a tobacco leaf grade to the at least one tobacco leaf bale, associate the unique identifier of the at least one tobacco leaf bale with information related to the at least one tobacco leaf bale, the information including at least one of the determined moisture content of the at least one tobacco leaf bale, the measured bale weight of the at least one tobacco leaf bale, and the assigned grade of the at least one tobacco leaf bale, or any combination thereof, transmit the information related to the at least one tobacco leaf bale to the tobacco product manufacturing facility over the communications link, and add the information related to the at least one tobacco leaf bale to the unique identifier of the at least one tobacco leaf bale.

5. The mobile receiving station of claim 4, further comprising:

a display configured to display the information related to the at least one tobacco leaf bale.

6. The mobile receiving station of claim 4, wherein the at least one processor is further configured to execute the computer readable instructions to:

receive a determined value for the at least one tobacco leaf bale from the tobacco product manufacturing facility based on the transmitted information.

7. The mobile receiving station of claim 4, wherein the at least one processor is further configured to execute the computer readable instructions to:

generate a bill of lading for shipment of the at least one tobacco leaf bale to the tobacco product manufacturing facility based on the transmitted information.

8. The mobile receiving station of claim 1, further comprising:

a toter, the toter including, at least one of a safety shower, an eye wash station, a fire extinguisher, a furnace, or any combination thereof.

9. The mobile receiving station of claim 1, wherein the lateral transfer is a 90° transfer.

10. The mobile receiving station of claim 1, wherein the second direction is perpendicular to the first direction.

11. The mobile receiving station of claim 1, further comprising:

a trailer including the loading ramp, the unloading ramp, the scale, the conveyor belt, the lateral transfer, or any combination thereof.

12. The mobile receiving station of claim 11, wherein the trailer is attached to a motor vehicle.

13. A method comprising:

receiving at least one tobacco leaf bale into a mobile receiving station via a loading ramp, the loading ramp arranged along a first direction;

transferring the at least one tobacco leaf bale to a conveyor belt;

measuring a bale weight of the at least one tobacco leaf bale using a scale;

transferring the at least one tobacco leaf bale from the conveyor belt to an unloading ramp using a lateral transfer; and unloading the at least one tobacco leaf bale from the mobile receiving station using the unloading ramp, the unloading ramp arranged in a second direction different from the first direction of the loading ramp.

14. The method of claim 13, further comprising:

determining a moisture content of the at least one tobacco leaf bale using a moisture sensor.

15. The method of claim 14, further comprising:

receiving a unique identifier corresponding to the at least one tobacco leaf bale using a scanner;

assigning a tobacco leaf grade to the least one tobacco leaf bale;

associating the unique identifier of the at least one tobacco leaf bale with at least one of the tobacco leaf grade, the bale weight, the determined moisture content, or sub- any combination thereof; and adding information related to the at least one tobacco leaf bale to the unique identifier, the information including at least one of the tobacco leaf grade or the bale weight.

16. The method of claim 15, further comprising:

displaying the information related to the at least one tobacco leaf bale on a display panel.

17. The method of claim 15, further comprising:

transmitting information related to the at least one tobacco leaf bale to a tobacco product manufacturing facility over a communications link; and receiving a determined value for the at least one tobacco leaf bale from the tobacco product manufacturing facility based on the transmitted information.

18. The method of claim 17, further comprising:

generating a bill of lading for shipment of the at least one tobacco leaf bale to the tobacco product manufacturing facility based on the transmitted information.

19. The method of claim 13, wherein the lateral transfer is a 90° transfer.

20. The method of claim 13, wherein the second direction is perpendicular to the first direction.

* * * * *